(12) United States Patent
Malipaard et al.

(10) Patent No.: US 10,581,341 B2
(45) Date of Patent: Mar. 3, 2020

(54) CURRENT CONVERTER CIRCUIT

(71) Applicant: Fraunhofer-Gesellschaft zur Förderung der angewandten Forschung e.V., München (DE)

(72) Inventors: Dirk Malipaard, Nürnberg (DE); Benjamin Ruccius, Nürnberg (DE); Martin März, Nürnberg (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 16/197,520

(22) Filed: Nov. 21, 2018

(65) Prior Publication Data

US 2019/0165693 A1 May 30, 2019

(30) Foreign Application Priority Data

Nov. 24, 2017 (DE) .................... 10 2017 221 085

(51) Int. Cl.
*H02M 7/483* (2007.01)
*H02M 7/00* (2006.01)
(Continued)

(52) U.S. Cl.
CPC .......... *H02M 7/483* (2013.01); *H02M 7/003* (2013.01); *H02M 7/49* (2013.01); *H02M 2001/0012* (2013.01); *H02M 2007/4835* (2013.01)

(58) Field of Classification Search
CPC .................................................... H02M 7/48
See application file for complete search history.

(56) References Cited

U.S. PATENT DOCUMENTS 7,518,886 B1 * 4/2009 Lai ........................... H02P 8/12
363/17
2016/0020016 A1 * 1/2016 Ouyang ................ H02M 1/10
307/31

(Continued)

FOREIGN PATENT DOCUMENTS

WO 2016/081473 A1 5/2016

OTHER PUBLICATIONS

Long, Y., et al.; "A Hybrid Modulation Method for Improved Modular Multilevel Converter applied for Power Quality Compensation in Medium Voltage;" 1st International Future Energy Electronics Conference (IFEEC); 2013; pp. 789-793.

(Continued)

*Primary Examiner* — Kyle J Moody
*Assistant Examiner* — Trinh Q Dang
(74) *Attorney, Agent, or Firm* — McClure, Qualey & Rodack, LLP

(57) ABSTRACT

A current converter circuit in a modular multilevel topology includes an AC voltage terminal with a first phase terminal and a further voltage terminal with a plus and a minus terminal. The current converter circuit includes two arms, wherein the first arm connects the first phase terminal and the first terminal and the second arm the second phase terminal and the minus terminal. Each arm includes at least two submodules connected in series, wherein one of the at least two submodules is implemented as analog cell including a passive device as well as an electric circuit. The passive device is connected in parallel to the electric circuit and connected in series with respect to the other one of the at least two submodules.

23 Claims, 20 Drawing Sheets

(51) Int. Cl.
*H02M 7/49* (2007.01)
*H02M 1/00* (2006.01)

(56) References Cited

U.S. PATENT DOCUMENTS

2016/0359427 A1* 12/2016 Ghosh .................. H02M 7/217
2018/0091037 A1*  3/2018 Zhao ....................... H02M 1/10
2018/0109202 A1*  4/2018 Marquardt ............ H02M 7/483

OTHER PUBLICATIONS

Samajdar, D., et al.; "Hybrid Modulation Method for Low-Switching Frequency Operation of Modular Multilevel Converter," 43rd Annual Conference of the IEEE Industrial Electronics Society (IECON); 2017; pp. 1226-1231.

* cited by examiner

US 10,581,341 B2

CURRENT CONVERTER CIRCUIT

CROSS-REFERENCE TO RELATED APPLICATIONS

This application claims priority from German Patent Application No. 10 2017 221 085.0, which was filed on Nov. 24, 2017, and is incorporated herein in its entirety by reference.

Embodiments of the present invention relate to a current converter circuit in a modular multilevel topology as well as to a method of operating the same.

BACKGROUND OF THE INVENTION

Modular multilevel converters (MMC) are inverters where high voltages are generated in that some or even several hundred modules are connected in series such that the series connection is each connected to the positive or negative DC voltage and a phase, e.g., the first phase of the three-phase current, respectively. Each module has, for example, its individual IGBT phase and can be switched independent of the other modules. Thus, it becomes possible that the generated AC voltage can be switched in as many level steps as submodules exist. With several hundred submodules, an almost perfect sinusoidal shape can be generated.

Normally, in the arm consisting of the individual submodules, a so-called arm inductance is provided that serves to smooth the output voltage and hence to increase the output voltage quality (AC side). For obtaining improved output voltage quality, for example, the arm inductance is increased. The arm inductance also limits the current rise velocity which can reduce the switching frequency and the regulator velocity.

SUMMARY

According to an embodiment, a current converter circuit in a modular multilevel topology may have: an AC voltage terminal with at least one first phase terminal; a further voltage terminal with a first terminal and a second terminal; a first arm connecting the first phase terminal and the first terminal; a second arm connecting the first phase terminal and the second terminal; wherein the first and second arm each include at least two submodules connected in series; wherein at least one of the at least two submodules is implemented as analog cell including a passive device as well as an electric circuit, wherein the passive device is connected in parallel to the electric circuit and connected in series in relation to the other one of the at least two submodules.

According to another embodiment, a method for operating an inventive current converter circuit may have the steps of: controlling the analog cell with a first switching frequency; and controlling the other one of the at least two submodules with a second switching frequency, wherein the first switching frequency is higher than the second switching frequency.

Another embodiment may have a non-transitory digital storage medium having a computer program stored thereon to perform the method for operating an inventive current converter circuit, the method having the steps of: controlling the analog cell with a first switching frequency; and controlling the other one of the at least two submodules with a second switching frequency, wherein the first switching frequency is higher than the second switching frequency, when said computer program is run by a computer.

Embodiments of the present invention provide a current converter circuit in a modular multilevel topology with an AC voltage terminal, implemented at least in a single-phase manner, as well as a further voltage terminal, such as a DC voltage terminal. The further voltage terminal/DC voltage terminal includes a first terminal (plus terminal) and a second terminal (minus terminal). The current converter circuit includes a first and a second arm having at least two, but advantageously a plurality of submodules connected in series, which are implemented, for example, as full bridges. The first arm connects the first phase terminal of the AC voltage terminal to the first/plus terminal while the second arm connects the first phase terminal to the second/minus terminal. One of the submodules is configured as so-called analog cell. The analog cell includes an electric circuit as well as an analog device. The passive device and the electric circuit are connected in parallel, wherein the passive device is connected in series with respect to the others of the at least two submodules.

Embodiments of the present invention are based on the knowledge that in a structure based on the conventional MMC structure a step-by-step voltage modulation can still be performed with the individual submodules while modulation of the voltages is performed by a specific submodule, namely the so-called analog cell, such that the transitions between the individual steps are smoothed or "filled". This takes place in that a temporal voltage curve is built up in the analog cell via an analog device, such as a capacitor, by means of an electric circuit, such as a full bridge which then results in a smoothing of the curve after summing up with the voltage that has already been built up step-by-step. Thereby, improved output voltage quality (AC side) can be obtained while simultaneously minimizing the arm inductances in the modular multilevel converter. Further, in such a current converter circuit, higher dynamics (faster adaptation of the output and input side currents/voltages) is obtained.

Regarding the operating method, it should be noted that the "normal", i.e. the other submodules are operated with a low switching frequency, such as 50 Hz, while the analog cell is operated with a very high switching frequency (in the range of several kilohertz) in order to allow the modulation of the continuous change from step to step. Due to the fact that the low switching frequency can be used in the normal cells, the same also have low switching losses.

Here, it should be noted that, according to embodiments, the passive device is a capacitor, but can also be implemented differently, for example as transformer. The electric circuit can be implemented, for example, as full bridge. According to an embodiment, the capacitor is coupled to the full bridge as follows. A central node of a first of two half bridges of the full bridges is connected via a first terminal of the capacitor, while a second terminal of the capacitors is coupled to a central node of the second of the two half bridges. Additionally, storage capacitance is provided between a first side of the two half bridges and a second side of the two half bridges. The voltage at the capacitor (as passive device) can be variably adjusted via the electric circuit including the full bridge outlined herein, in order to modulate the voltage across the steps accordingly, as discussed above.

According to embodiments, one or several inductances can be provided in the connecting path between the capacitor and the full bridge, such that, for example, the central node of the first half bridge is connected to the capacitor terminal via an inductance or at the central node via one inductance each. Here, it should be noted that the current converter circuit in such a structure can also be implemented without arm inductances, since the parasitic inductances might be sufficient, depending on the involved boundary conditions.

In a further embodiment, not only one full bridge but a plurality of full bridges is provided, which are all connected in parallel. This multiphase structure of the parallel cells is capable of interleave operation and results in a higher voltage quality and in a reduction of a possibly existing arm inductance. Here, in one embodiment, as already discussed above, an inductance can be provided between the capacitor terminal and the respective central node of the half bridge of the full bridges. Additionally, the parallel connection also has the option that the inductances are electromagnetically coupled to one another.

According to a further embodiment, the above-discussed full bridge can be extended by a further half bridge, where the further half bridge is connected in parallel to the first of the two half bridges of the full bridge and also a connection between the central node of the further half bridge and the first capacitor terminal is provided. This variation also enables interleave operation and results in higher voltage qualities while simultaneously minimizing the arm inductance. The connection can be implemented with or without inductance.

According to a further embodiment, it would also be possible that the above-discussed full bridge is coupled as follows. Both half bridges of the full bridge are connected to the first capacitor terminal via their central nodes, wherein a first side of the half bridges is electrically coupled to a second side of the half bridges via two capacitances connected in series. In the central node of the capacitance series connection, the second capacitor terminal is coupled. This variation also offers the advantage of interleave operation and increased voltage quality with small arm inductance.

When it is assumed that the passive device is configured as transformer, the electric circuit can be configured as follows. The electric circuit includes a full bridge which is connected to the two sides of the transformer via the central nodes of the half bridges. Here, again, an inductance can be provided between a transformer terminal and a central node of the half bridge, wherein replacing this inductance by the inductors of the transformer would also be possible. This variation is capable of interleave operation. According to an embodiment, a filter capacitance that serves to smooth the voltage can be provided parallel to the transformer.

In further embodiments, depending on the arm, a plurality of submodules, such as three, 12 or 100, is provided. The current converter circuit described herein can also be extended by multiphase operation, such as three-phase operation, such that all in all six arms are implemented for the three-phase operation that are all implemented with the respective submodule and an analog cell.

According to further embodiments, also the analog cells can be configured together across two arms belonging to one phase, such that, for example, each analog cell includes a half bridge and these half bridges are connected to one another via their central nodes via a further full bridge. Further, it would also be possible that two passive devices, which are provided with a respective voltage with the help of allocated half bridges, are provided per arm.

A further embodiment relates to a method for operating the current converter circuit. Here, the analog cell is controlled with a first switching frequency and the one or several other cells/submodules with a second switching frequency, wherein the first switching frequency is higher (e.g. 100 to 200 KHz) than the second switching frequency (e.g. 50 Hz). As already stated above, by this control, the modulation of the voltage across the passive device, such as the capacitance, can take place such that voltage jumps in the total voltage curve are compensated, i.e. that the same is smoothed without needing large arm inductances. According to embodiments, the control of the analog cells can be performed according to the following formula:

$$U_{arm\_set} - U_{arm\_cells\_normal} = U_{arm\_analog\_cell};$$

wherein $U_{arm\_set}$ is the set voltage curve, $U_{arm\_cells\_normal}$ the voltage curve generated by the other one of the at least two submodules and $U_{arm\_analog\_cell}$ is the voltage curve generated by the analog cell.

When the usage of a full bridge with storage capacitance as electric circuit in the analog cell is assumed, the full bridge can be controlled such that balancing of the voltage at the storage capacitance is performed which allows, on average, a constant voltage at the passive device.

The switching time can be shifted in order to reduce or increase the electric power received or delivered at the analog cell such that balancing is enabled.

BRIEF DESCRIPTION OF THE DRAWINGS

Embodiments of the present invention will be detailed subsequently referring to the appended drawings, in which:

FIG. 1b-1d are schematic illustrations of possible implementations of the cells of the current converter circuit of FIG. 1a;

DETAILED DESCRIPTION OF THE INVENTION

Before embodiments of the present invention will be discussed below based on the accompanying drawings, it should be noted that equal elements and structures are provided with the same reference numbers, such that the description of the same is inter-applicable or exchangeable.

Figure 1A:
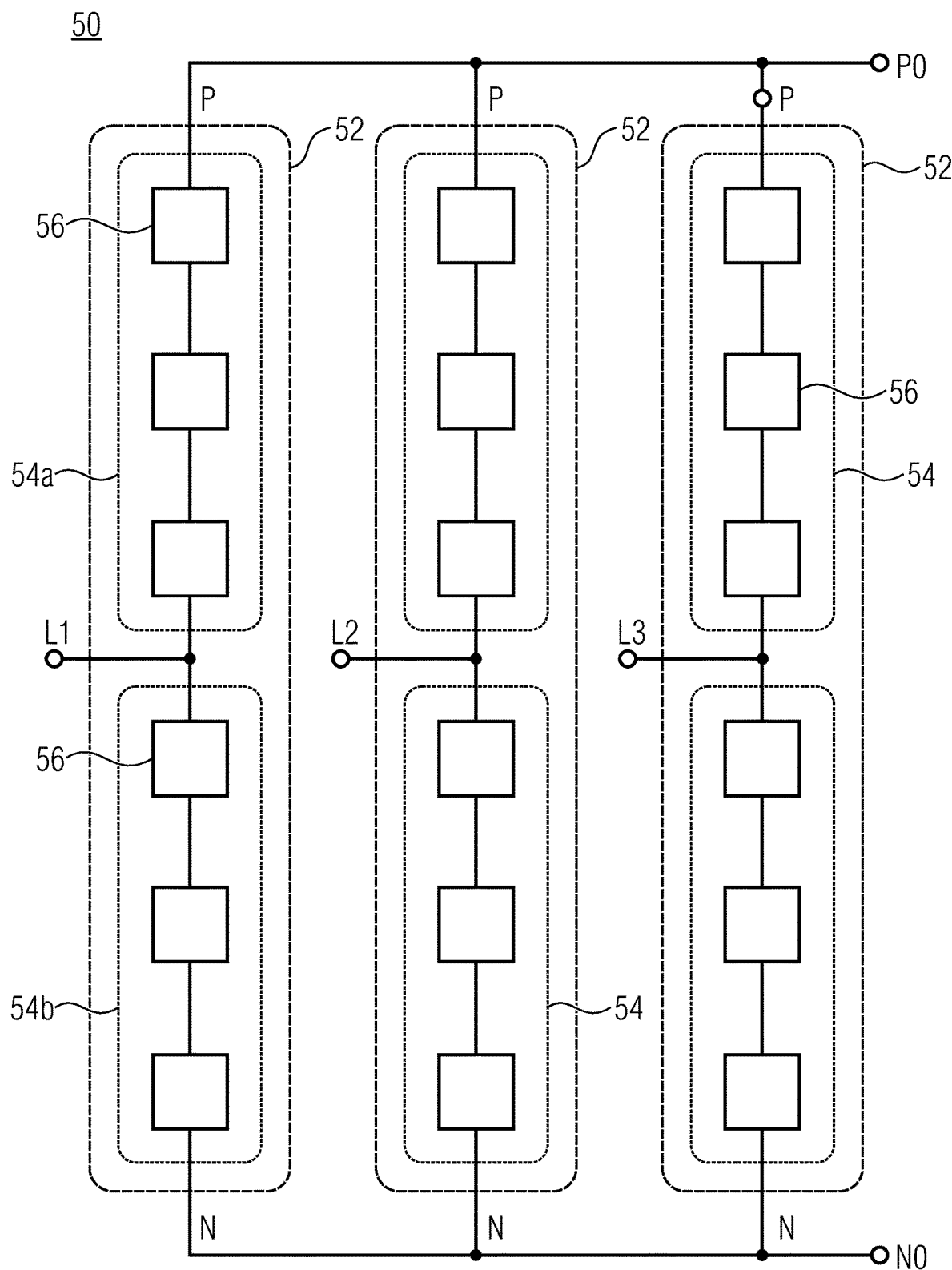
FIG. 1a is a schematic block diagram of a current converter circuit in MMC topology according to conventional technology for discussing the basic mode of operation.

FIG. 1a shows a cell-based multilevel converter 50 including three phase modules 52 for a three-phase system. The phases are indicated by L1, L2 and L3. Each of the phase modules 52 comprises two arms 54. The first arm 54a is connected between the phase L1 and the plus terminal P or P0 (generally: first terminal of the further voltage terminal), while the second arm 54b is provided between the phase L1 and the minus terminal N or N0 (generally: second terminal of the further voltage terminal). The arms of the phase modules 52 connected in parallel, which are provided between the phases L2 and plus P/P0 and minus N/N0, respectively, and L3 and plus P/P0 and minus N/n0, respectively, are analog to that.

Figure 1B:
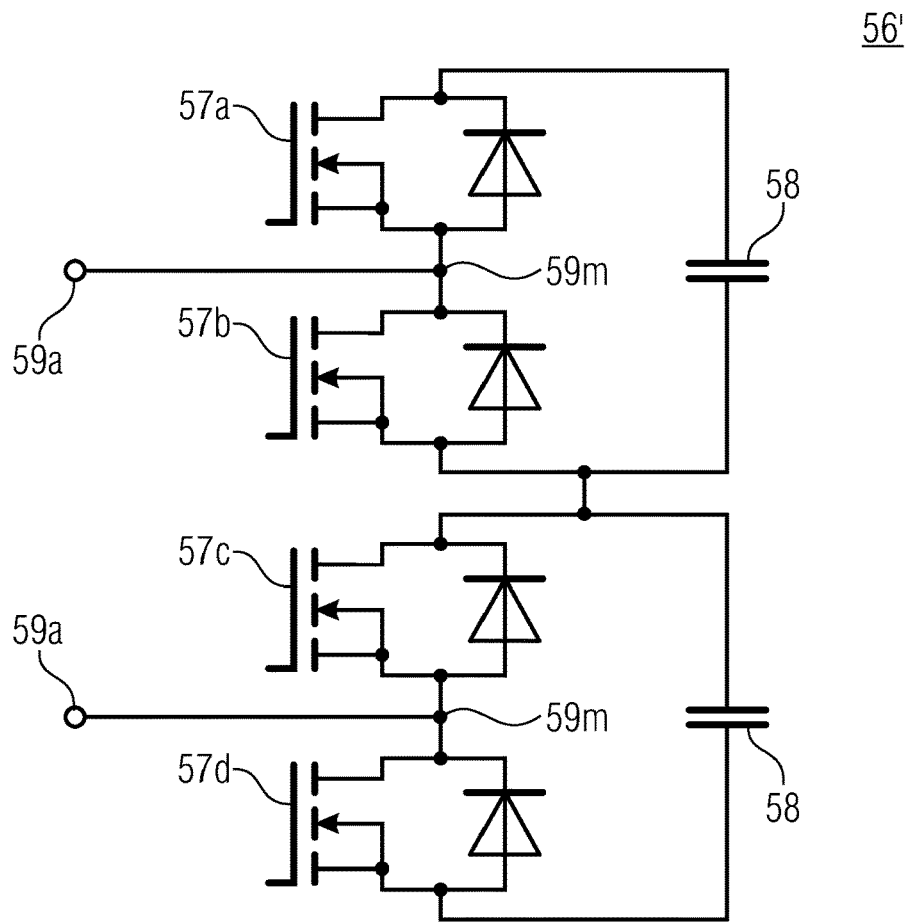
Figure 1C:
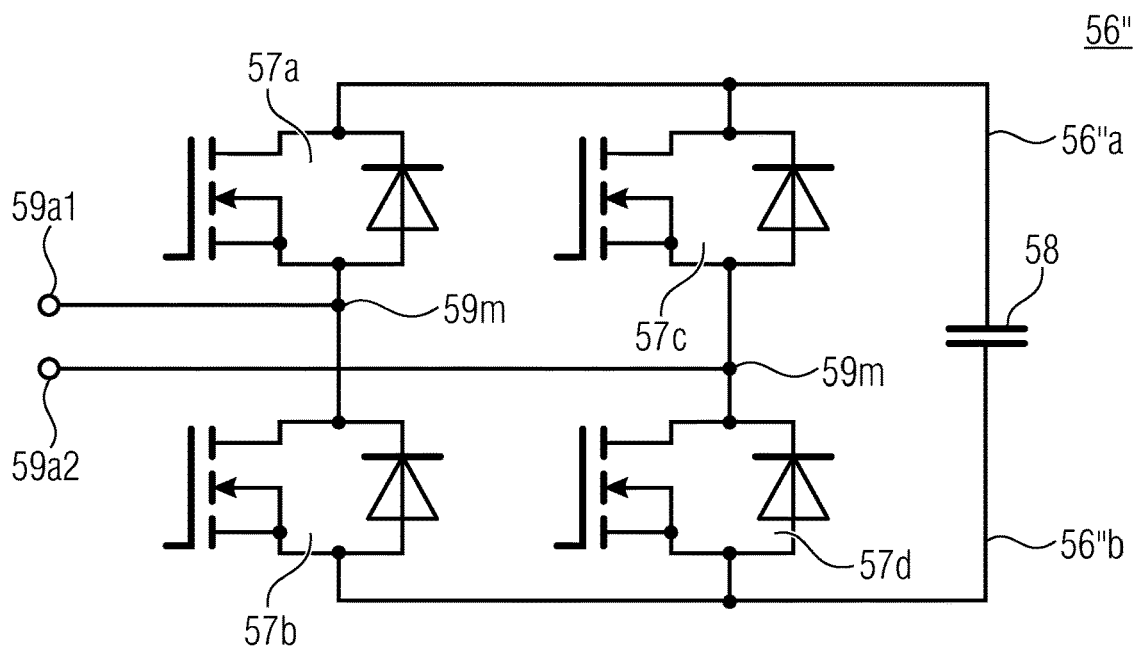
Figure 1D:
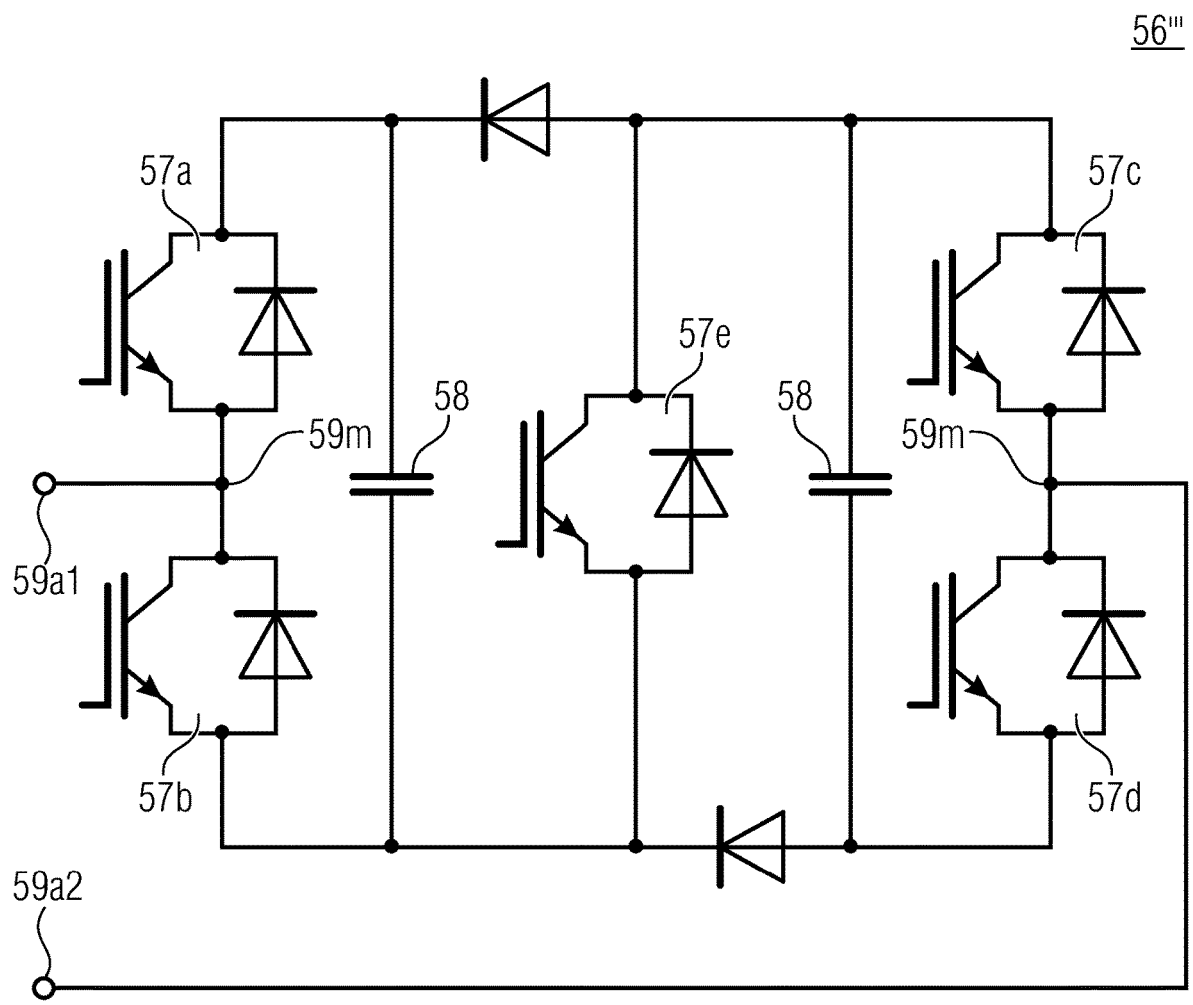

With reference to FIG. 1b to 1d, three possible implementations of the submodule 56 (also called cells) will be explained.

FIG. 1b shows a possible cell implementation 56', where the cell 56' is implemented as double cell. Here, for example, four enhancement mode N-channel metal-oxide semiconductor field effect transistors (MOSFET) can be used, which are arranged in series. The MOSFETs are indicated by reference numbers 57a-d. A capacitance 58 is connected in parallel to two MOSFETs 57a and 57b and 57c and 57d, respectively, wherein one electrical terminal of the double cell each is provided between these respective two MOSFETs, i.e. at the central node 59m (between 57a and 57b and between 57c and 57d, respectively) (cf. reference number 59a).

FIG. 1c shows a full bridge 56" for the usage as submodule with four MOSFETs 57a to 57d. Both half bridges consisting of MOSFETs 57a and 57b and 57c and 57d, respectively, are connected between two sides 56"a and 56"b of the full bridge 56". The two sides 56"a and 56"b are connected to one another via a storage capacitance 58. The full bridge 56" is connected via the two terminals 59a1 and 59a2, each coupled to a central node 59m of the two half bridges, i.e. between 57a and 57b and between 57c and 57d, respectively.

FIG. 1d shows a so-called clamp double submodule 56''' including five MOSFETs 57a to 57e. The MOSFETs 57a to 57d are connected into two half bridges, wherein again the terminals 59a1 and 59a2 are connected via the respective central taps 59m. The fifth MOSFET 57e is provided between the two sides of the module 56". Additionally, two diodes are provided.

Starting from such submodules and the current converter circuit explained in FIG. 1a, it is needed to provide relatively large arm inductances per arm 54, 54a, 54b. The size is determined by the switching frequency, the step voltage and the modulation type. In conventional solutions, these arm inductances, also referred to as branch inductances, are dimensioned correspondingly large or higher switching frequencies are provided in the cells. For dimensioning the inductances smaller, a coupled version of the arm inductances have been provided in conventional technology. However, it is not needed to dimension the same accordingly. Subsequently, according to an embodiment, a solution will be explained where the arm inductances/branch inductances can be dimensioned smaller without decreasing the current quality on the AC side.

Figure 2A:
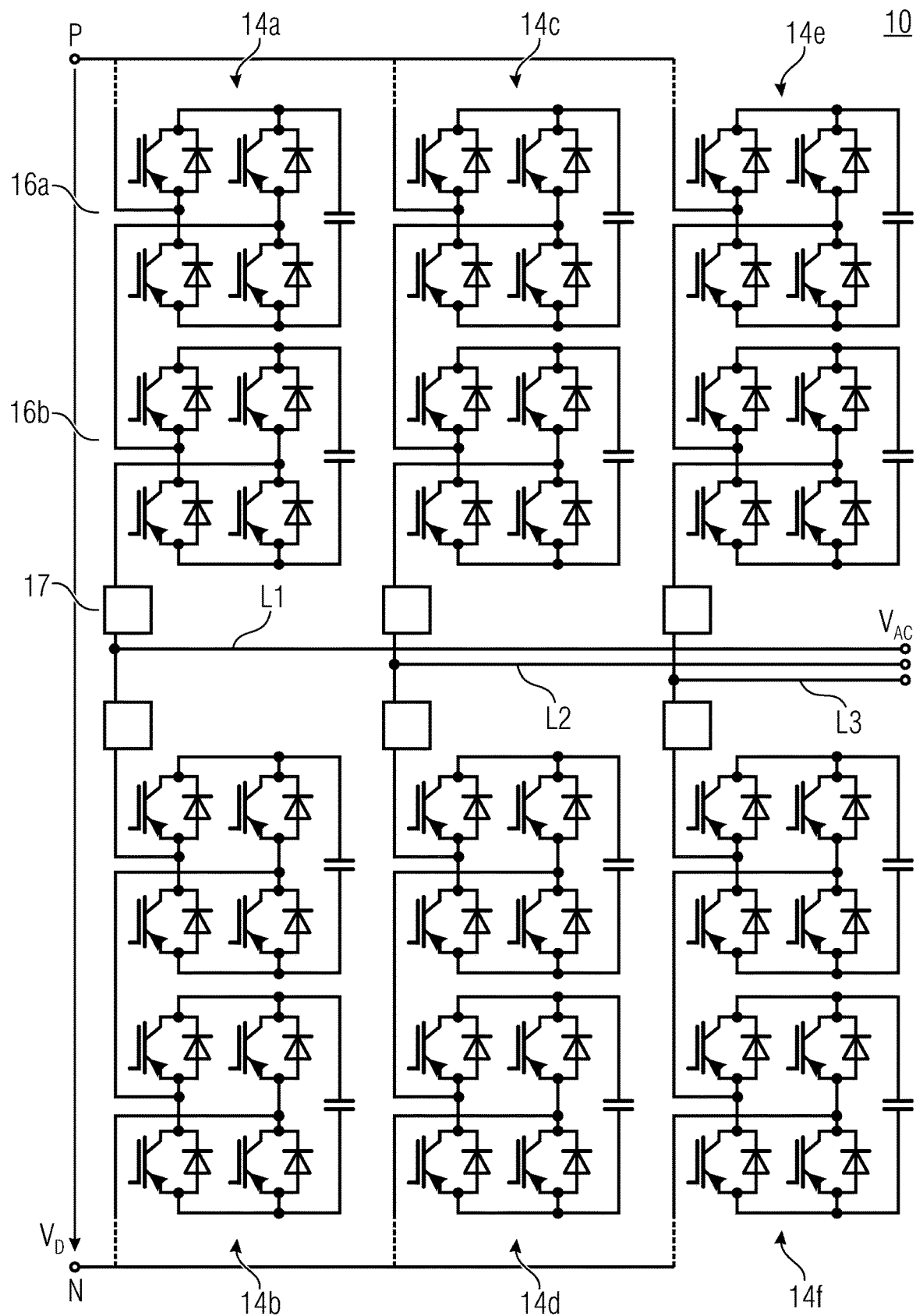
FIG. 2a, 2b are schematic illustrations of current converter circuits with one analog cell each per arm according to embodiments.
Figure 2B:
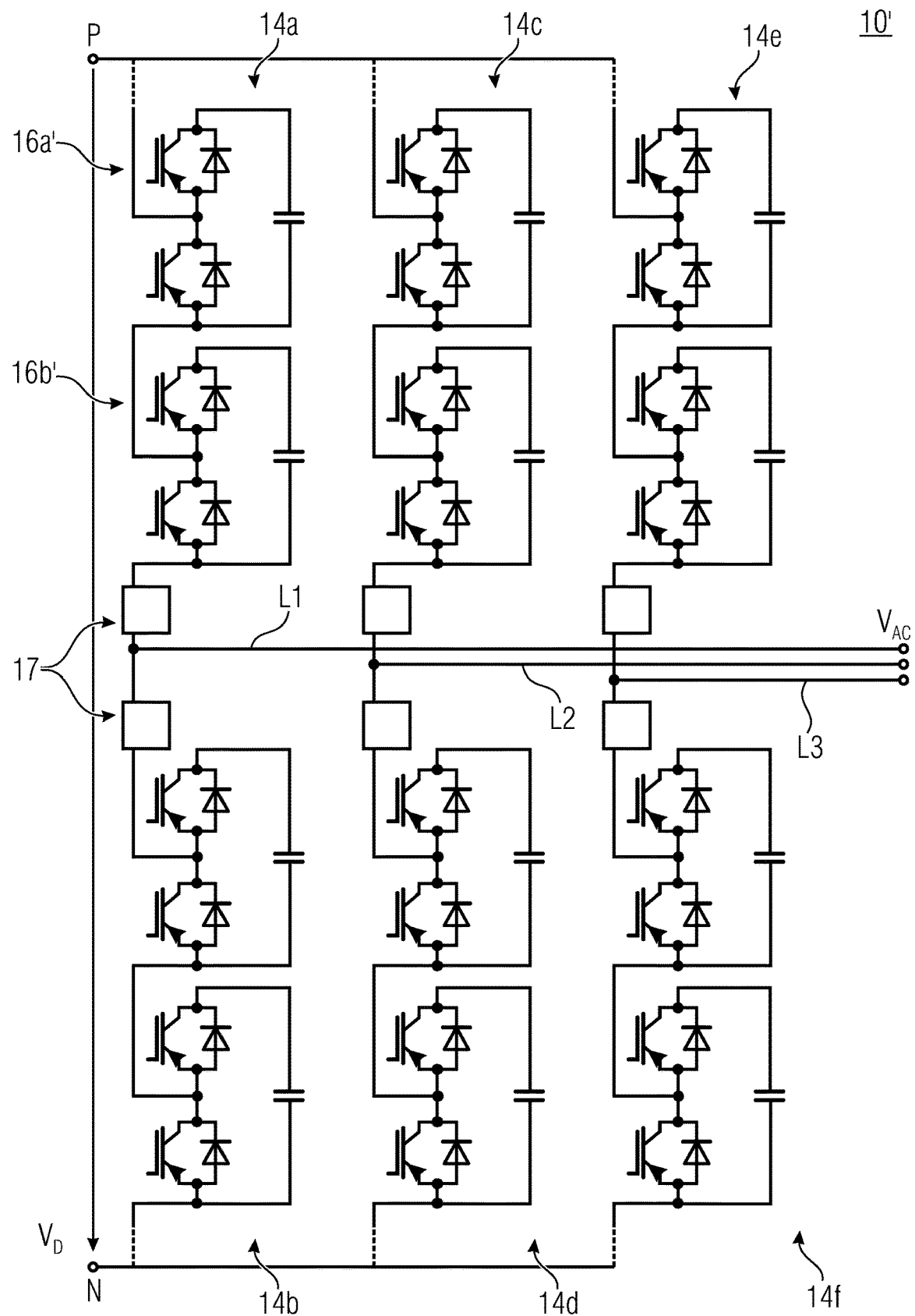

FIGS. 2a and 2b present two solutions based on three-phase current converter circuits, however, it should be noted that obviously also single-phase operation or two-phase operation is possible. FIG. 2a shows a current converter circuit 10 having six arms all in all for three-phase operation. The six arms are indicated by reference numbers 14a-14f. The arms 14a and 14b form a phase module for the first phase. Here, the arm 14a is arranged between the first phase L1 as well as the plus terminal, while the second arm 14b is arranged between L1 and the minus terminal N. P and N together form a DC voltage terminal (generally: further voltage terminal). In the same way, the arm 14c is arranged between L2 and P, while the arm 14d is arranged between L2 and N. Analogously, the arm 14e is arranged between L3 and P, while the arm 14f is arranged between L3 and N. L1, L2 and L3 form a three-phase AC voltage terminal.

Here, it should be noted that even when the current converter circuit 10 is explained in the context of a three-phase current converter circuit, the described principle can also be applied to current converter circuits having any other number of phases. Vice versa, this means that the single-phase basic embodiment of the current converter circuit 10 only includes arms 14a and 14b while arms 14c to 14f are optional.

Each arm 14a to 14f includes a plurality of submodules, here exemplarily explained based on the arm 14a. The arm 14a includes the first submodule 16a as well as the second submodule 16b. Both are formed by full bridges and are structured identically. The submodules 16a and 16b are connected in series. Concerning the exact implementation of the submodules, reference is exemplarily made to FIG. 1c. The submodule 17 forms the so-called analog cell.

The submodule 17 and the analog cell 17, respectively, is connected in series to the submodules 16a and 16b.

Figure 2C:
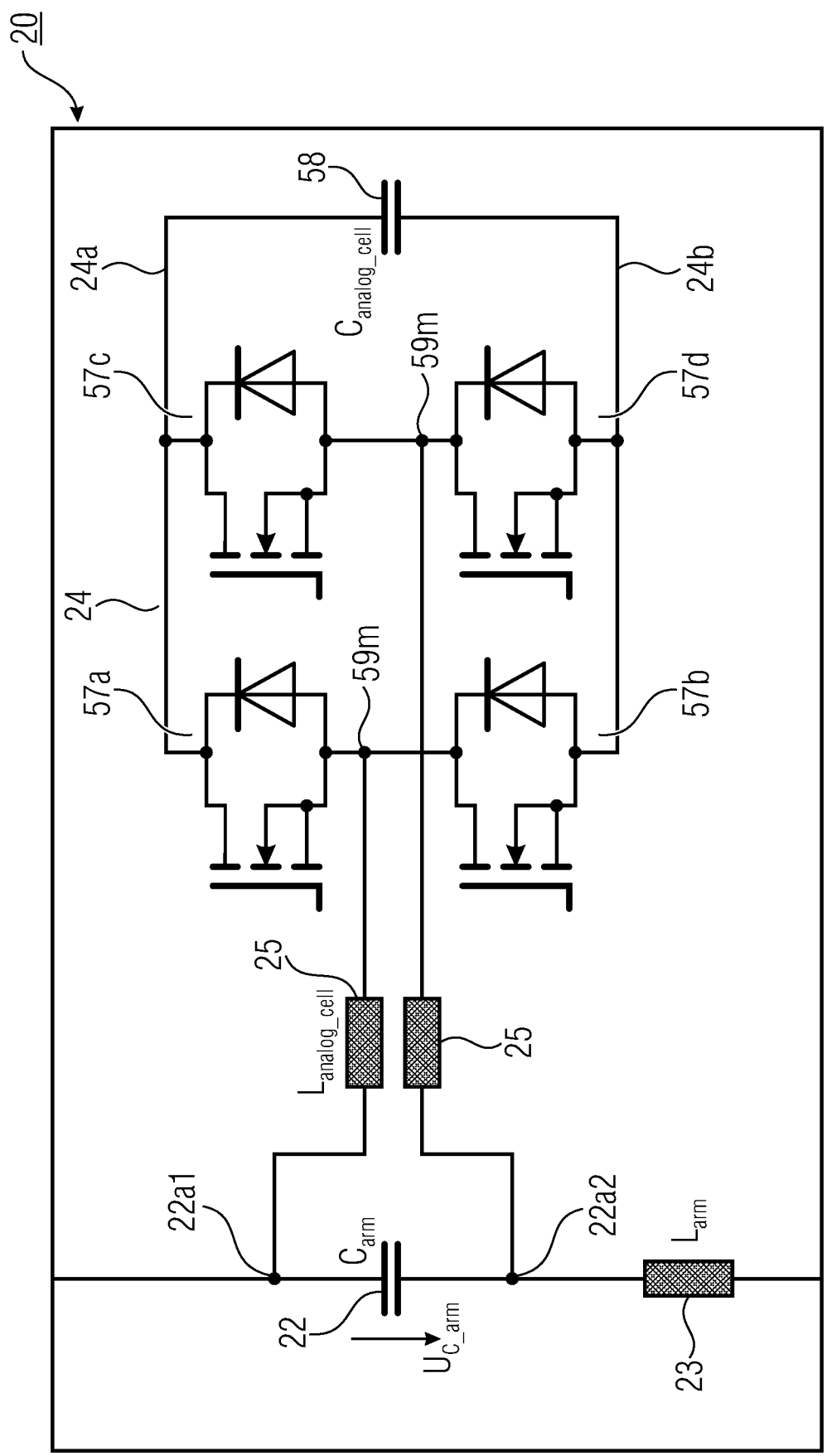
FIG. 2c is a schematic illustration of a possible implementation of an analog cell for the current converter circuits of FIGS. 2a and 2b.

The cell 20 illustrated in FIG. 2c, for example, can be used as analog cell. The cell 20 includes a passive device, here a capacitance 22 which can also be referred to as $C_{arm}$. The passive device 22 is connected in series to the further submodules (cf. FIG. 2a, module 16a and 16b). Additionally, an optional arm inductance 23 can be downstream of the series. An electric circuit, here a full bridge 24, is provided in parallel to the passive device 22. As discussed with reference to FIG. 1c, the full bridge is made up of four transistors, such as four MOSFETs 57a to 57d, wherein these MOSFETs 57a to 57d form two half bridges. The two half bridges (57a plus 57b and 57c plus 57d) are connected to one another on a first side and on a second side. The respective potential taps are indicated by reference numbers 24a and 24b. The two sides 24a and 24b are connected to one another via a storage capacitance 58. This storage capacitance is also indicated as $C_{analog\_cell}$.

The electric circuit 24 is connected to the terminals of the capacitor via the respective central taps 59m of the two half bridges, such that the circuit 24 is connected in parallel to the capacitor 22. In detail, the capacitor 22 includes a first terminal 22a1 and a second terminal 22a2. The first terminal 22a1 is connected to the central tap 59m of the first half bridge, including elements 57a and 57b, while the second terminal 22a2 is connected to the central tap 59m of the second half bridge, including elements 57c and 57d. Concerning the functionality, the full bridge 24 can be considered as ideal voltage source that impresses a respective voltage to the capacitor 22. The impressed voltage $U_{C\_arm}$ will be discussed below. For operating the full bridge 24, electric energy is latched on the latch 58 wherein the charge is as constant as possible. This can be controlled via the elements of the full bridge 24. In this embodiment, the connection is not provided in a direct manner, but via inductances 25, which are also referred to as $L_{analog\_cell}$.

In the current converter circuit 10, the cell 20 can be used as analog element 17 in each of the arms 14a to 14f.

This cell can also be used in the current converter circuit 10' of FIG. 2b. Like the current converter circuit 10, the current converter circuit 10' includes six arms 14a to 14f that are arranged between phases L1/L2/L3 and P and N, respectively. The difference of the current converter circuit 10' with respect to the current converter circuit 10 is the implementation of the submodules 16a and 16b, here implemented as half bridges. The analog cell 17, such as the analog cell of FIG. 2c is arranged in series to these submodules 16a' and 16b' configured as half bridges.

After the exact circuit topology has been discussed based on the basic embodiment, in the following, the mode of operation and in particular the control of the analog cell with respect to the further submodules will be explained.

Figure 2D:
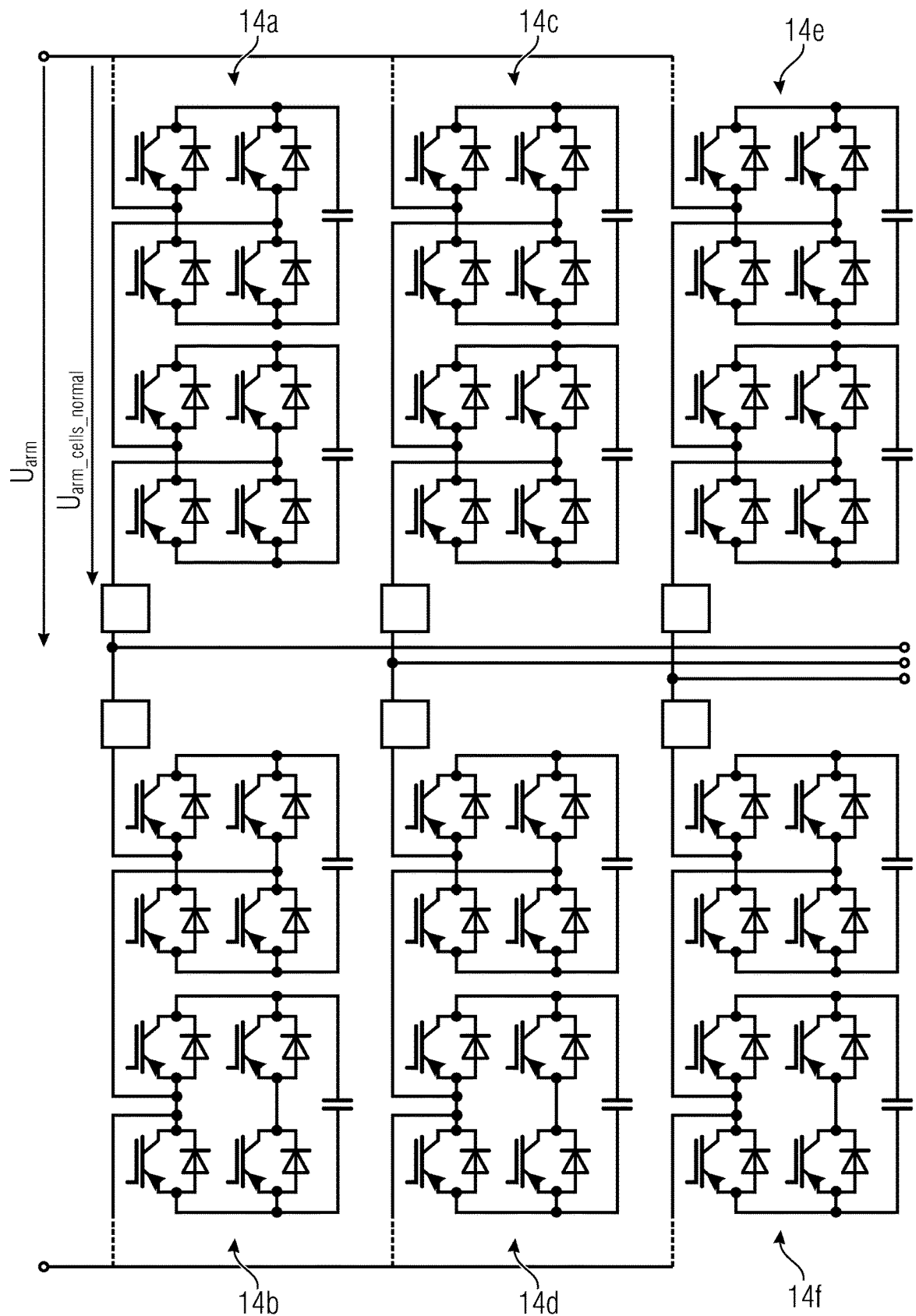
FIG. 2d is a schematic illustration of the current converter circuit of FIG. 2b, wherein additional voltage arrows are illustrated for explaining the mode of operation.
Figure 3A:
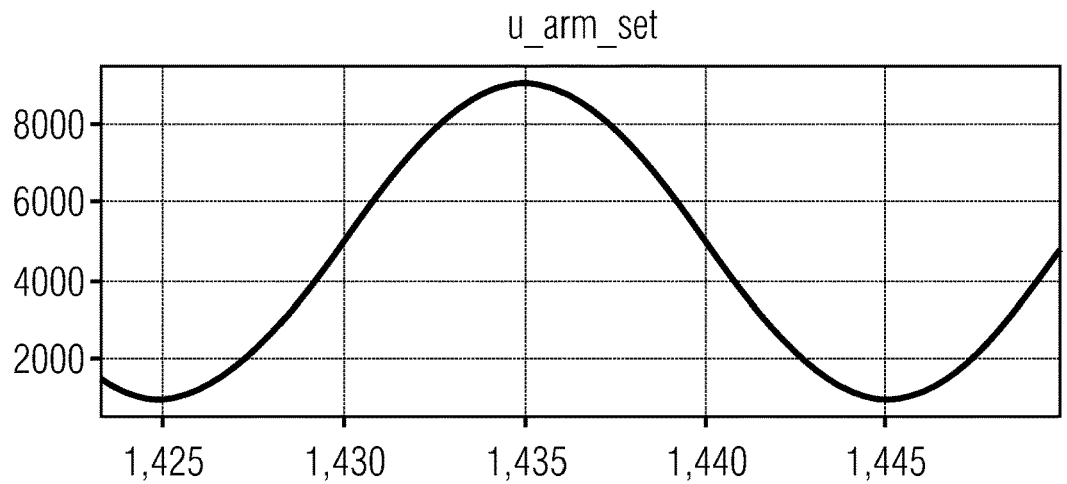
FIG. 3a-c are schematic voltage diagrams for discussing the mode of operation of the current converter circuit of FIG. 2d as well as the analog cell of FIG. 2e according to embodiments.
Figure 3B:
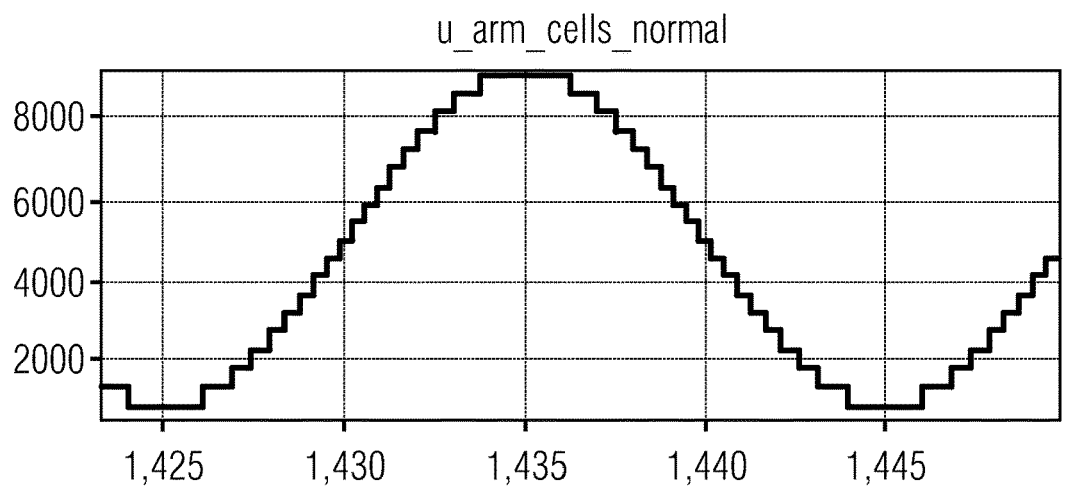

Basically, starting from a voltage $V_D$ applied between P and N, a modular multilevel converter presented herein operates such that by connecting individual submodules, such as submodule 16a and 16b, the voltage at the phase output L1 can be increased step-by-step. Depending on how many submodules are provided, the desired AC voltage can be easily reproduced. This is shown, for example, in FIG. 3b. FIG. 3b shows the approximation of the desired AC voltage $U_{arm\_cells\_normal}$ to $U_{arm\_set}$ (cf. FIG. 3a). For illustrating $U_{arm\_cell\_normal}$, reference is made to FIG. 2d illustrating the current converter topology of FIG. 2a, wherein the voltages $U_{arm\_cell\_normal}$ and $U_{arm}$ are indicated.

The aim of the modulation is that $U_{arm}$ corresponds to the desired voltage curve $U_{arm\_set}$. The submodules 16a and 16b and 16a' and 16b', respectively, can reproduce the set curve shape 12 step-by-step, namely as shown by $U_{arm\_cell\_normal}$.

Figure 3C:
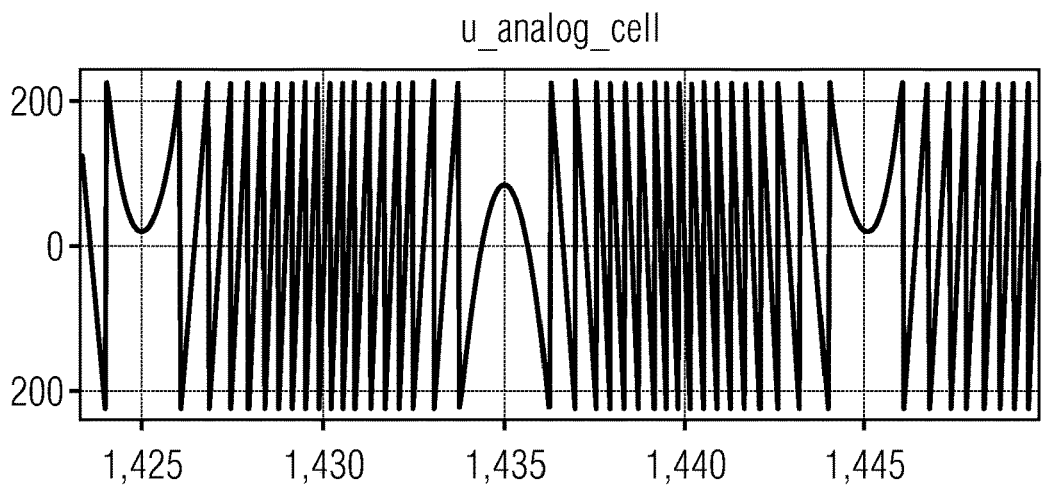

For smoothing the step jumps, a voltage is generated by means of the analog cell which overlaps with the voltage $U_{arm\_cell\_normal}$ by addition in the series connection and hence $U_{arm\_set}$ is supplemented accordingly. The voltage generated by the analog cell is indicated in FIG. 3c. As can be seen, the missing part of the voltage when comparing $U_{arm\_set}$ and $U_{arm\_cell\_normal}$ is reproduced by means of the analog cell, such that, for example, in the rising sinusoidal edge or falling sinusoidal edge, a ramp is reproduced while the plateau is supplemented to the sinusoidal function at the minimum and at the maximum. In order to exactly reproduce the ramp or any curve shape, the analog cell is controlled with a significantly higher clock frequency. The clock frequency is, for example, in a range of 100 or 200 kHz.

For each time, the voltage to be reproduced by means of the analog cell can be calculated by the formula $U_{arm\_set} - U_{arm\_cells\_normal}$.

By re-modulating the difference, the smoothing typically performed by the arm inductances can be omitted or reduced, respectively, such that, as a result, the arm inductance is minimized, wherein the voltage/current quality increases. Due to the high clocking of the analog cell, the entire circuit is highly dynamic. Since the submodules are controlled with low switching frequency, switching losses are also minimized such that there are low losses all in all.

With reference to FIGS. 4a to 4d and the enlarged illustrations 4e to 4i of the diagrams of FIGS. 4a to 4d, an extended mode of operation will be explained.

Figure 2E:
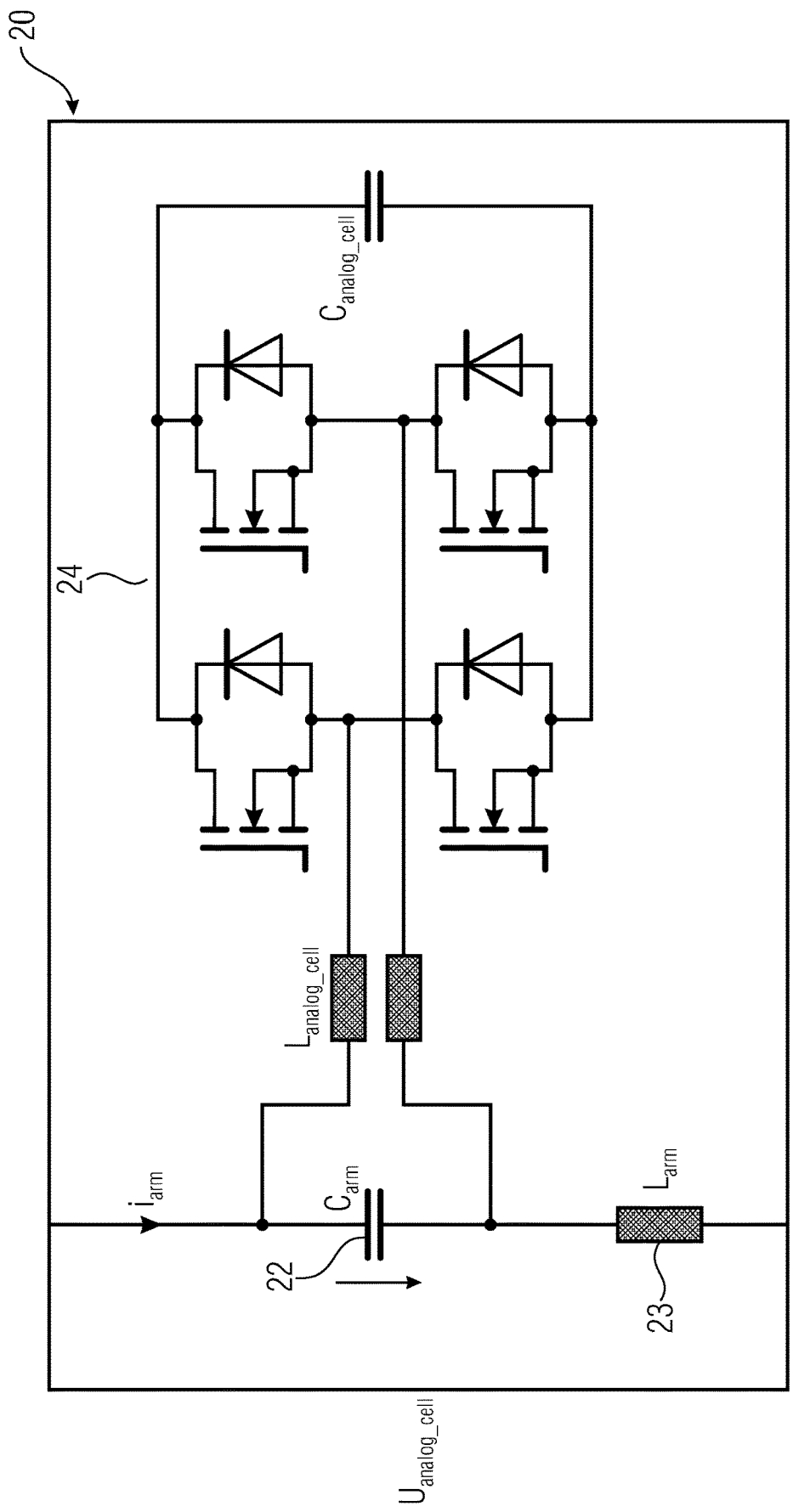
FIG. 2e is a schematic illustration of the analog cell of FIG. 2c, wherein additional voltage arrows are illustrated for explaining the mode of operation.
Figure 4A:
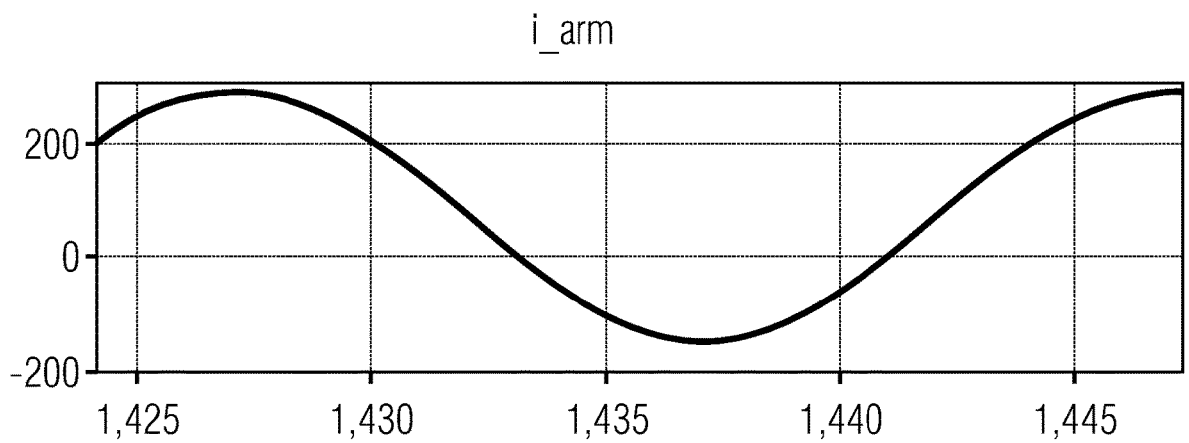
FIG. 4a-h are schematic diagrams for illustrating an extended mode of operation of the current converter circuit or cell of FIGS. 2d and 2e according to a further embodiment.
Figure 4B:
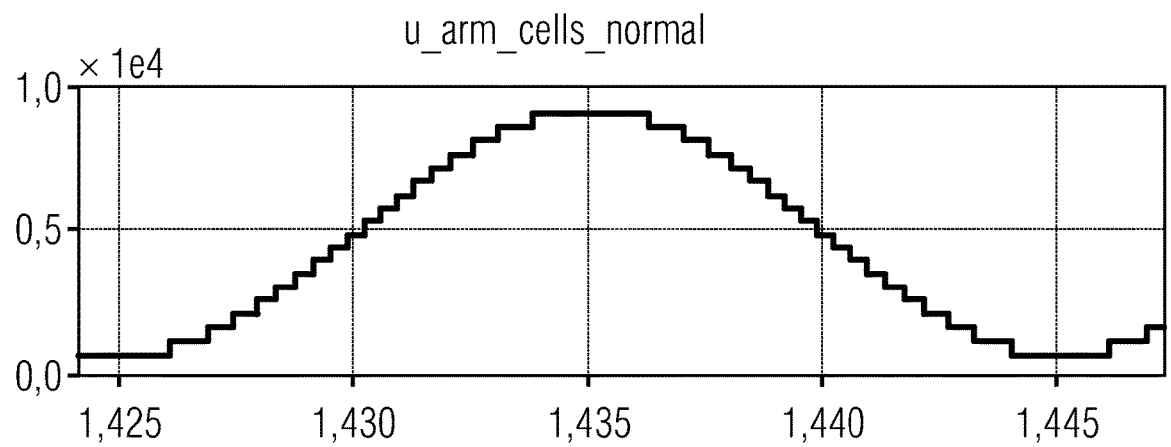
Figure 4C:
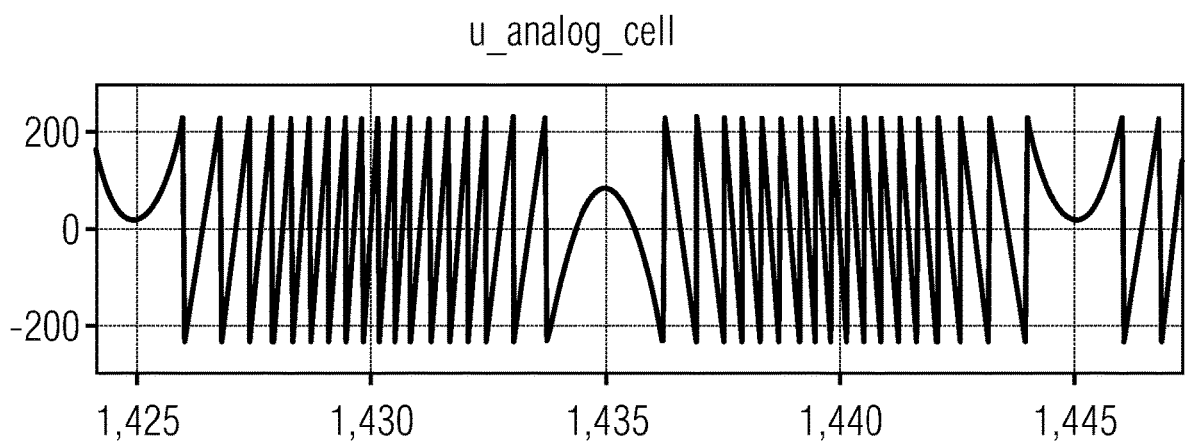
Figure 4D:
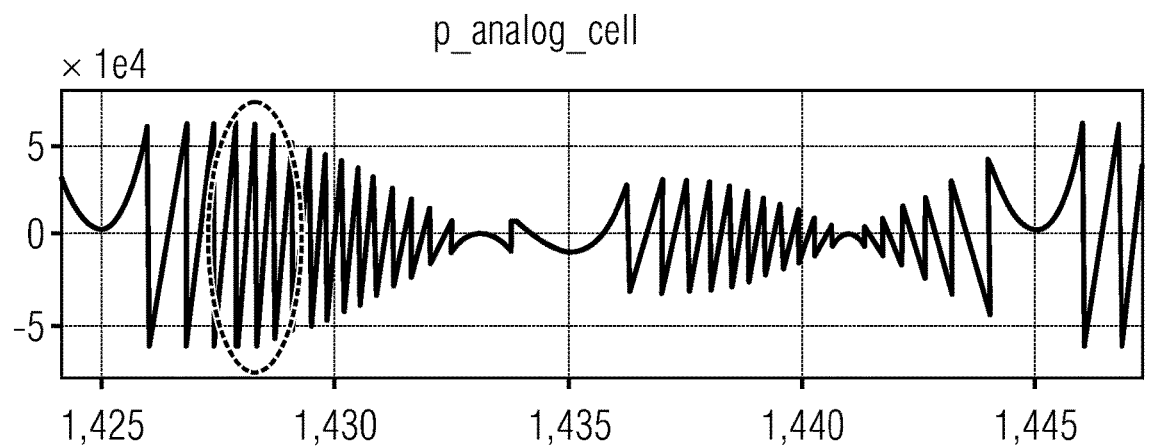
Figure 4E:
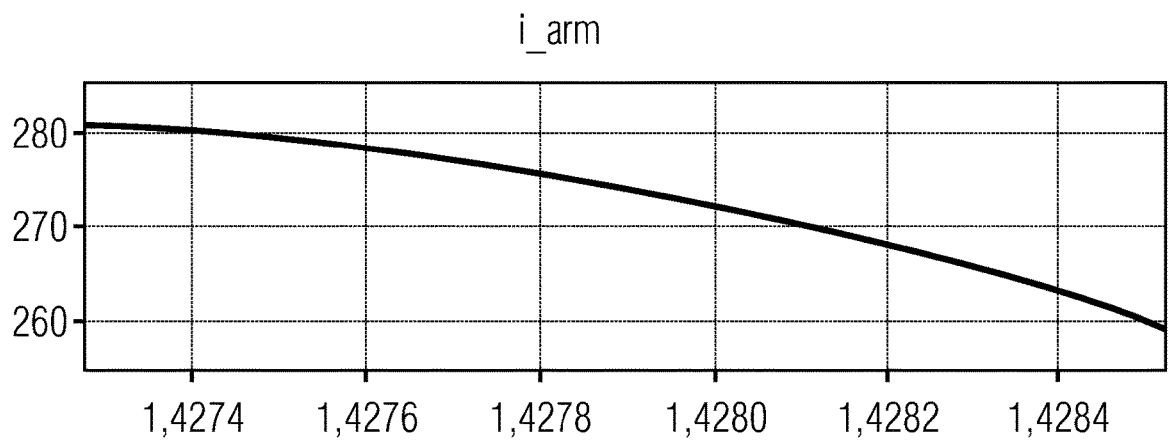
Figure 4F:
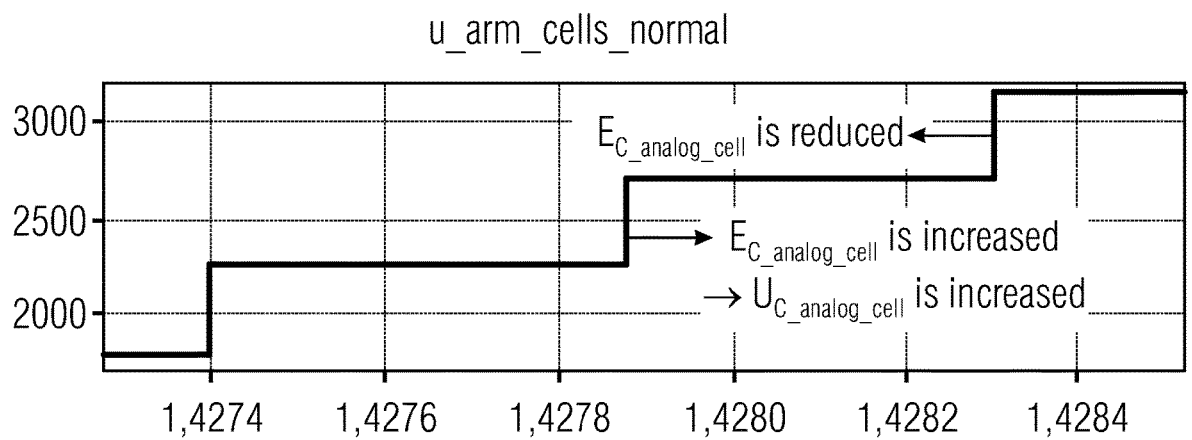
Figure 4G:
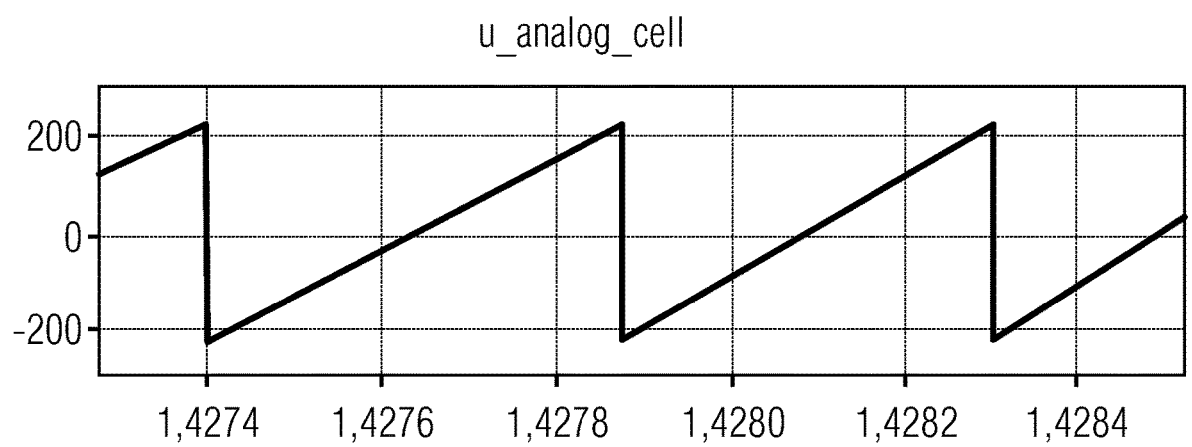
Figure 4H:
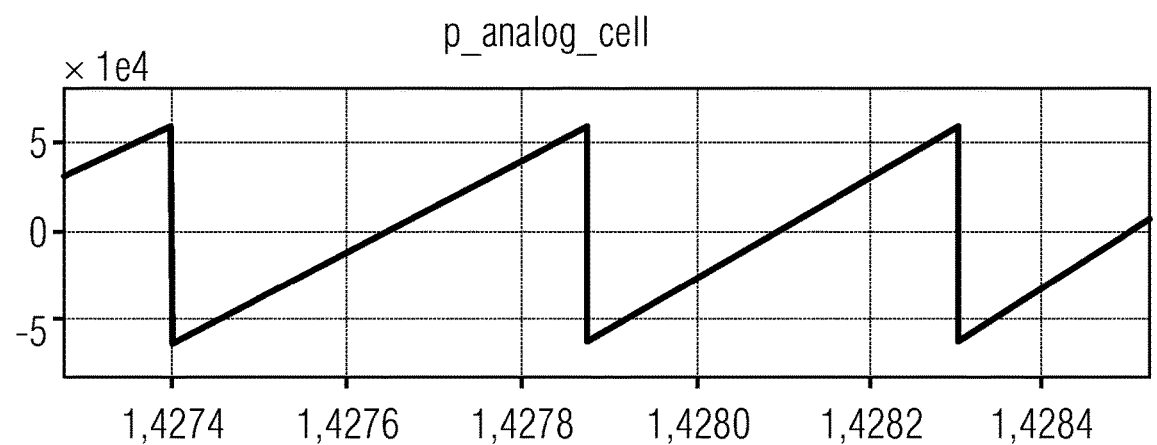

FIG. 4a shows the current flowing through the respective arm, compared to the voltage generated by the normal cells $U_{arm\_cells\_normal}$ (cf. FIG. 4b) and the voltage generated by the analog cell $U_{analog\_cell}$ (cf. FIG. 4c). From the product $I_{arm}$ (cf. FIG. 2e/$U_{analog\_cells}$) and $U_{analog\_cells}$, the power $P_{analog\_cell}$ absorbed by the analog cell results. A superposed regulator ensures a constant voltage (with defined voltage swing) in the analog cell/$C_{analog\_cell}$. This also opens up the possibility that $U_{C\_analog\_cell}$ can be influenced by specifically changing $U_{arm\_cells\_normal}$.

An enlargement of the diagrams 4a to 4d is illustrated in FIGS. 4e to 4h, wherein the enlargement in particular relates to the time axis. As illustrated, for example in FIG. 4f, by changing the switching times of the normal cell, the voltage in the analog cell can be influenced such that a specific influence of $U_{C\_analog\_cell}$ results by specifically changing the switching time of the step voltage of $U_{arm\_cell\_normal}$. This approach mainly assumes that the analog cell is activated simultaneously together with the individual steps as becomes obvious based on the comparison of diagrams 4f and 4g. If, for example, the switching time is shifted backwards, the voltage $U_{C\_analog\_cell}$ is increased and simultaneously the energy $E_{C\_analog\_cell}$ is increased. As indicated by the further arrow, vice versa, by bringing forward the next step, the energy $E_{C\_analog\_cell}$ and also the voltage $U_{C\_analog\_cell}$ can be reduced.

These two approaches of varying the switching times and varying the voltages in the normal cells have the aim that balancing in the analog cell (in particular the balanced charge across the capacitance 58) is influenced. Thus, according to embodiments, a mode of operation enables adapting the control of the analog cell such that balancing is obtained, wherein adapting is considered in relation to the normal cells or vice versa.

Figure 5A:
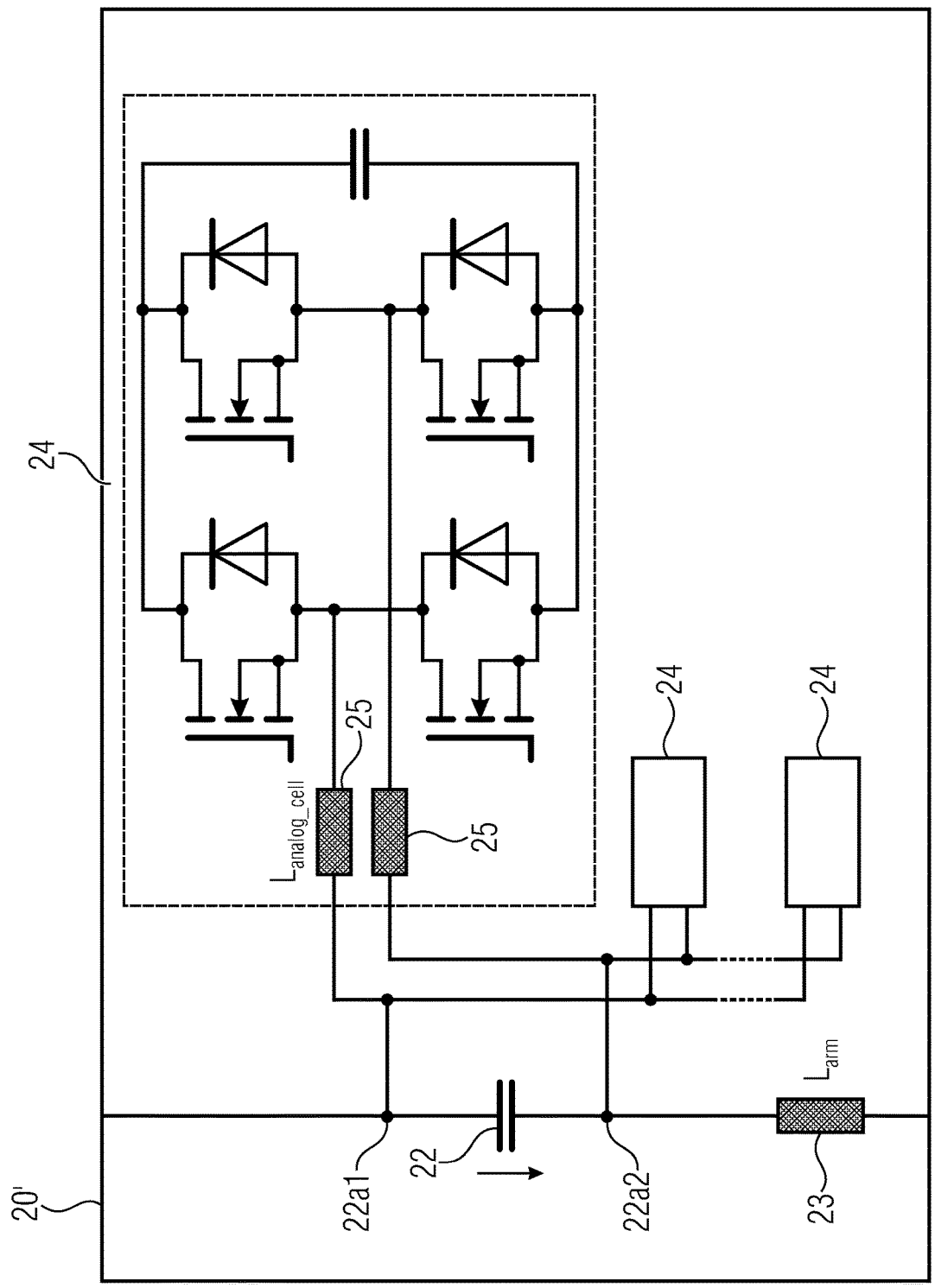
FIG. 5a-5b are schematic block diagrams of analog cells according to further embodiments.

In the following, with reference to FIGS. 5a and 5b, two alternative variations for implementing the analog cell will be illustrated. FIG. 5a shows an analog cell 20' with several full bridges 24 arranged in parallel. Each of these full bridges includes, as illustrated, the inductances 25, both on the side of the first terminal 22a1 and on the side of the second terminal 22a2 of the capacitor 22. Such a variation of implementing the analog cell 20' allows, on the one hand, interleave operation, further reduction of the arm inductances $L_{arm}$ (cf. reference number 23) with high voltage quality.

Figure 5B:
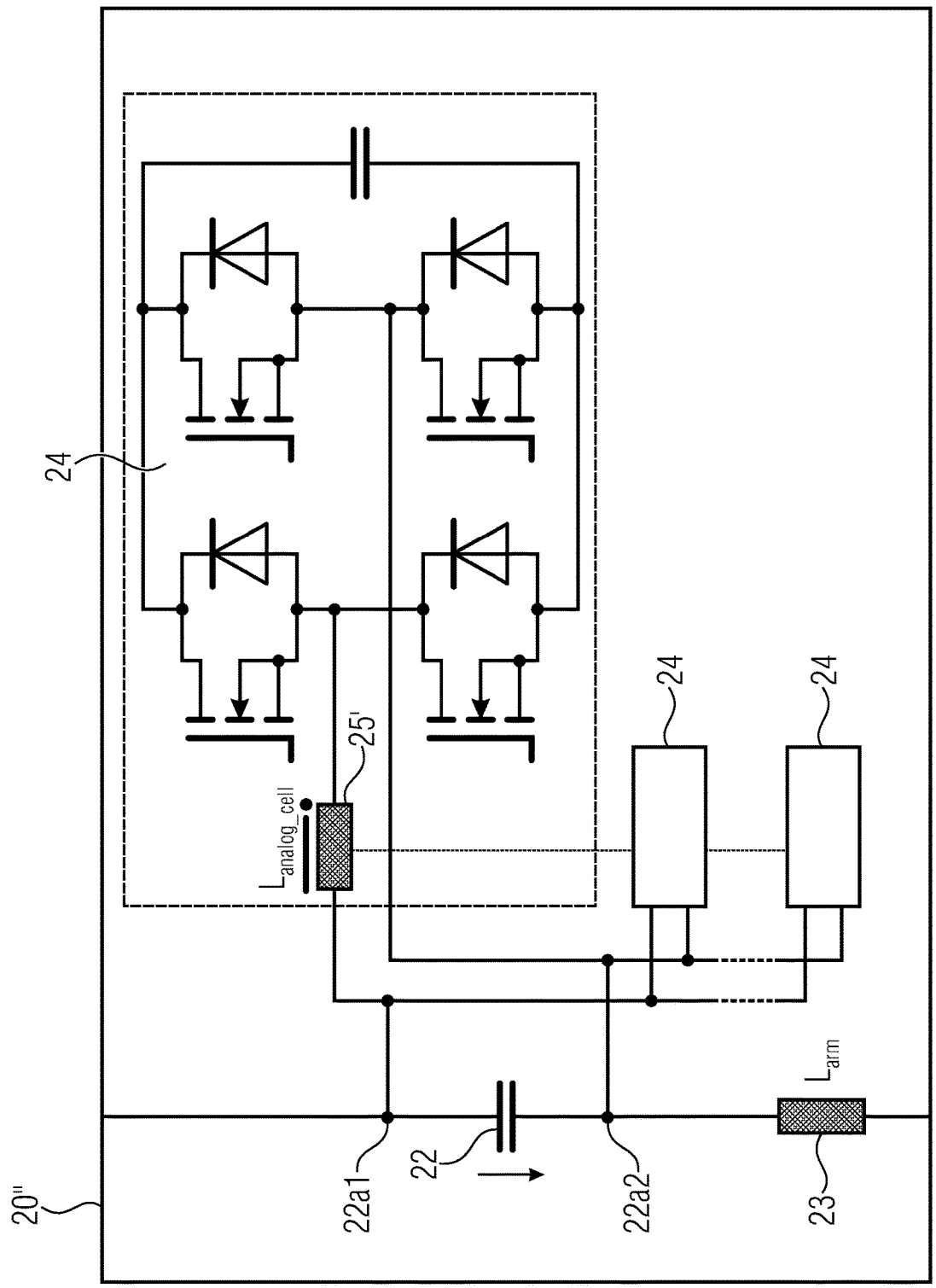

With reference to FIG. 5b, a further multiphase structure by parallel cells will be discussed. FIG. 5b shows an implementation of the analog cell 20'' that can essentially be compared to the implementation 20', wherein here the connection of the full bridges 24 to the terminals 22a1 and 22a2 is not realized via two inductances, but only with the help of one inductance on the side of the terminal 22a1. This one inductance is provided with reference number 25'. It is specific for the inductance 25' that each of the full bridges 24 has such an inductance and these inductances are electromagnetically coupled to one another, e.g. via a common core.

Figure 6A:
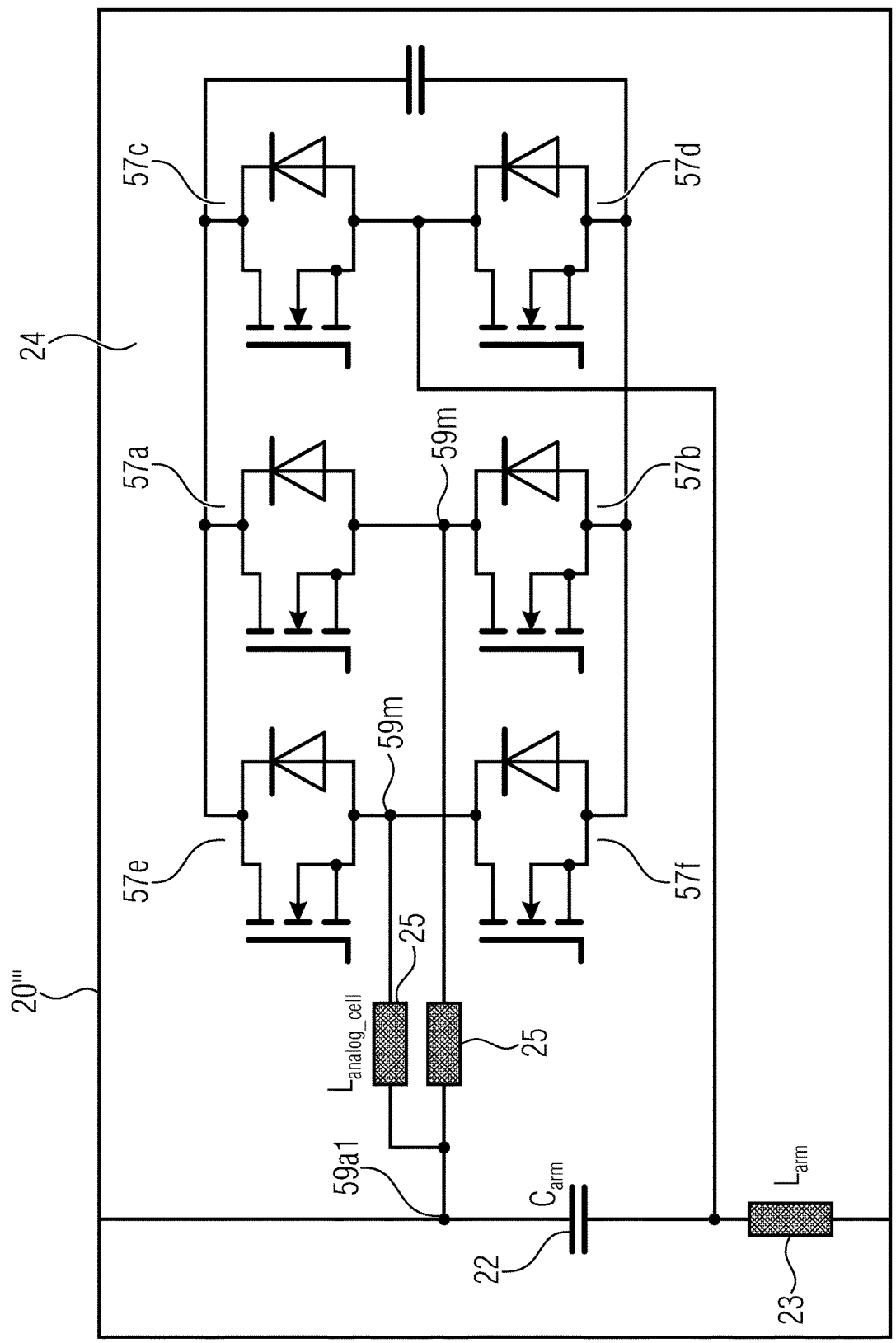
FIG. 6a, 6b are schematic block diagrams of analog cells according to additional embodiments.

FIG. 6a shows a further possible implementation of the analog cell 20'''. Here, one of the two half bridges of the full bridge 24 is duplicated, i.e. an additional half bridge is arranged parallel to the same. The duplicated half bridge includes MOSFETs 57a and 57b while the newly added half bridge comprises MOSFETs 57e and 57f.

The two half bridges 57a plus 57b as well as 57e plus 57b are each connected to the first capacitor terminal 59a1 via their central node 59m, wherein the connection is respectively made via an inductance $L_{analog\_cell}$ 25.

This variation of the analog cell 20''' can be used for multiphase cell construction, is capable of interleave operation and, as a result, the same has a higher voltage quality with reduced arm inductance. According to a further embodiment, it would also be possible that the inductances 25 are configured in a coupled manner for the two half bridges 57a plus 57b and 57e plus 57f. Also, in this variation, it would obviously be possible that several such bridge pairs are connected (cf. FIGS. 5a and 5b).

Figure 6B:
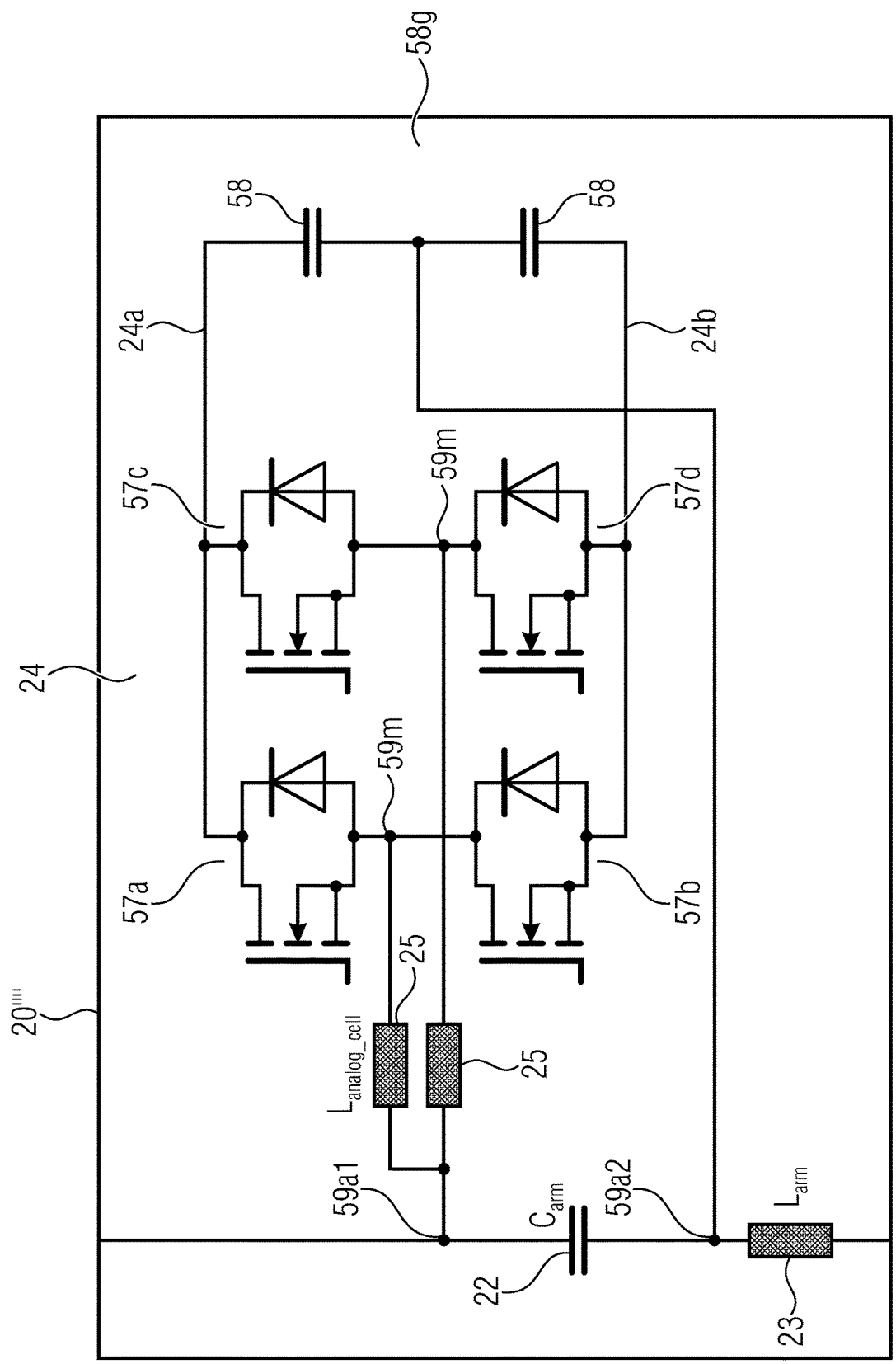

FIG. 6b shows an amended variation of an analog cell, here provided with reference number 20''''. The analog cell 20'''' is essentially comparable to the analog cell 20' and based on a full bridge 24. Here, however, the full bridge 24 is switched differently. Both half bridges 57a plus 57b and 57c plus 57d are connected to the first capacitor terminal 59a1 via their central nodes 59m, wherein here again, the connection is made via one inductance 25/$L_{analog\_cell}$ per half bridge. Here, the second capacitor terminal 59a2 is connected directly to the central point 58g of the storage capacitances 58. The storages of two storage capacitances connected in series connect the first side of the two half bridges to the second side of the two half bridges (cf. reference number 24a and 24b).

In this multiphase cell structure with capacitive half bridge, it is obviously also possible that the inductances 25 ($L_{analog\_cell}$) are coupled to one another. In this variation of the analog cell 20'''', interleave operation is possible, wherein here also a higher voltage quality with lower arm inductance $L_{arm}$ is enabled. Again, a higher number of half bridges are possible.

Figure 7A:
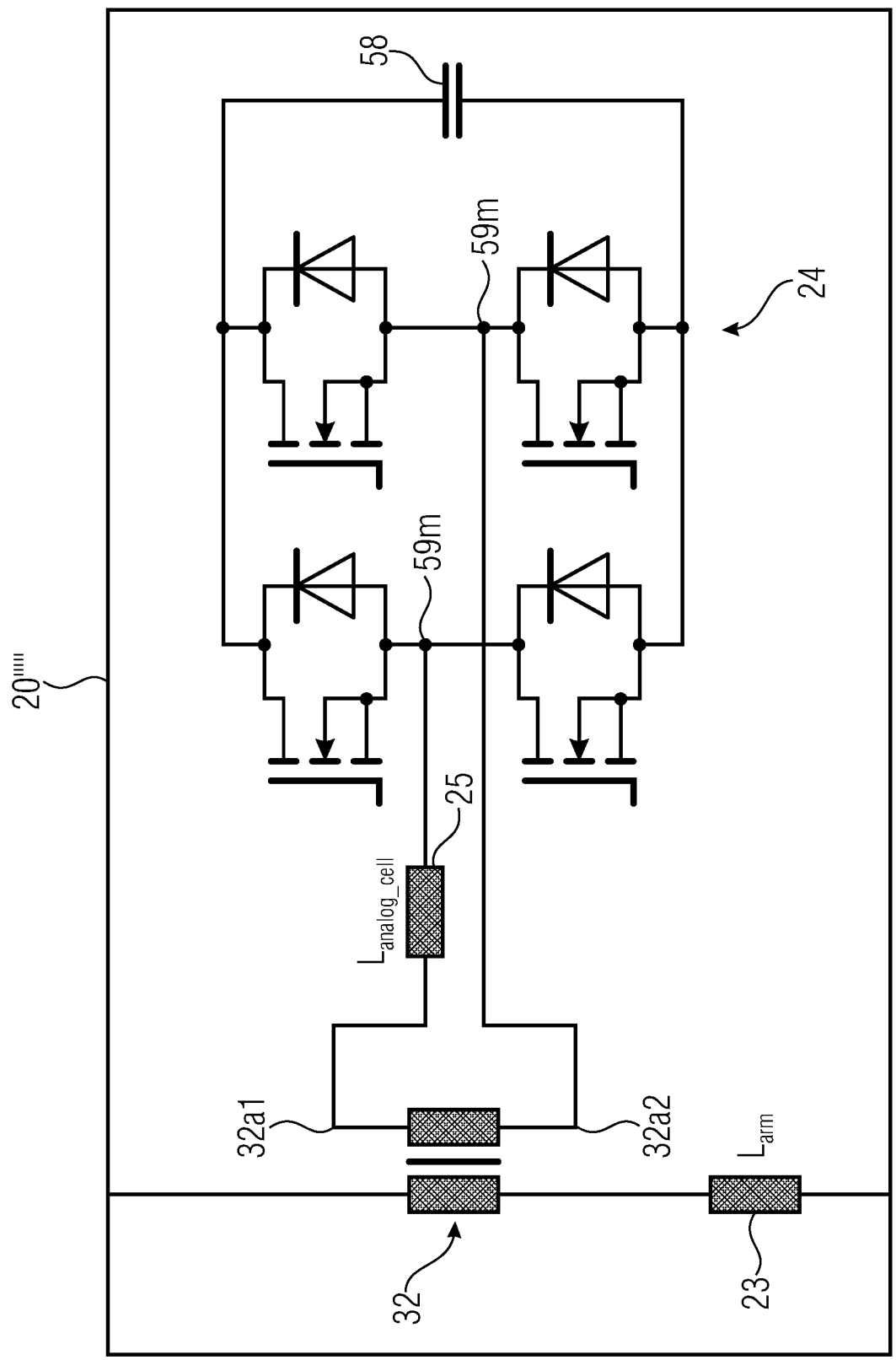
FIG. 7a, 7b are schematic block diagrams of analog cells with an additional transformer as passive device according to further embodiments.

FIG. 7 shows a further variation of the analog cell provided with reference number 20'''''. The analog cell 20''''' includes a full bridge 24 connected to the current converter circuit via a transformer 32. The transformer 32 serves as passive device and is connected in series to the further submodules. Again, the optional arm inductance 23 is provided parallel to the transformer 32. On the side of the full bridge 24, the transformer has two terminals 32a1 and 32a2 that are connected to the respective central nodes 59m. One of these connection paths includes also an inductance 25 ($L_{analog\_cell}$) connected in series. Here, it should be noted that both the arm inductance $L_{arm}$ (cf. reference number 23) as well as the cell inductance $L_{analog\_cell}$ (cf. reference number 25) can be replaced by $L_{sigma}$ of the transformer 32. With reference to the mode of operation, this variation does not differ from the above-discussed arm, where it should also be noted herein that it is to be stated that interleave operation is possible in a multiphase cell structure.

Figure 7B:
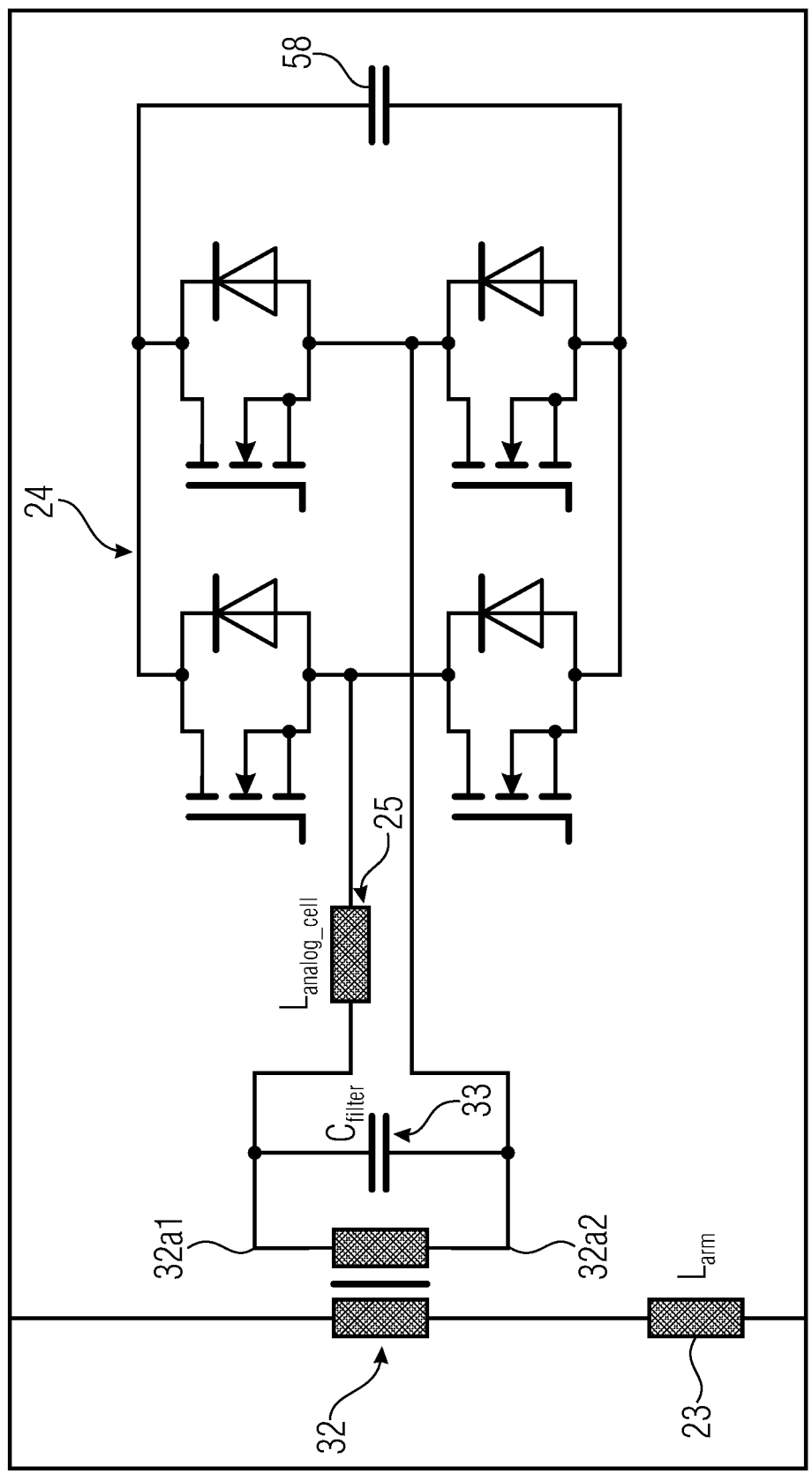

FIG. 7b shows an amended version of the analog cell 20''''', namely the analog cell 20'''''', wherein parallel to the transformer 32, i.e. between the two terminals 32a1 and 32a2, an additional filter capacitance $C_{filter}$ provided with the reference number 33 is provided. This variation is capable of interleave operation and allows, in contrary to the variation of FIG. 7a, additional smoothing of the voltage. According to embodiments, it is also possible that $L_{arm}$ (cf. reference number 23) and $L_{analog\_cell}$ (cf. reference number 25) are replaced by $L_{sigma}$ of the transformer 32.

Figure 8A:
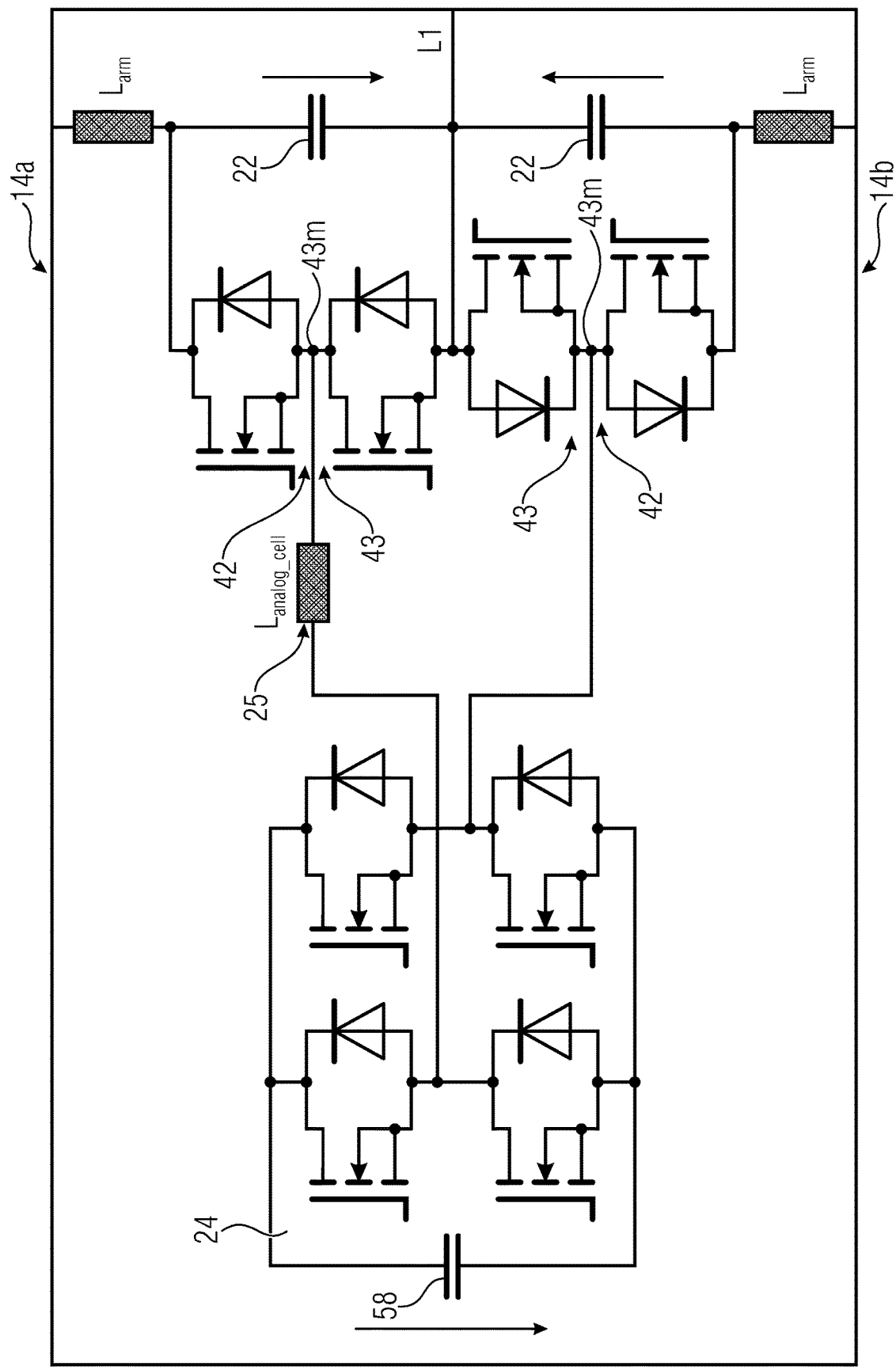
FIG. 8a, 8b are schematic block diagrams of analog cells according to further embodiments.

FIG. 8a shows a further variation of the analog cell, wherein the analog cells of two arms are combined. FIG. 8a shows two sections of the two arms 14a and 14b where the analog cell is arranged and where the arms 14a and 14b are connected to the phase terminal L1. Both arms each include an analog cell 42.

Each analog cell 42 includes an electric circuit 43 as well as a passive device, here again a capacitance 22, connected in series to the further submodule. When the capacitances 22 of the two analog cells 42 are considered, the same are connected in series, wherein between the capacitances, the phase L1 and one side of the electric circuit 43 each are applied. The electric circuit 43 is connected in parallel to the capacitance 22 and here implemented as half bridge. This means that each analog cell includes two MOSFETs. A further electric circuit, namely a full bridge 24, is coupled via the central node 43m of the two half bridges. Here, coupling is performed via an additional inductance $L_{analog\_cell}$ provided with reference number 25.

Figure 8B:
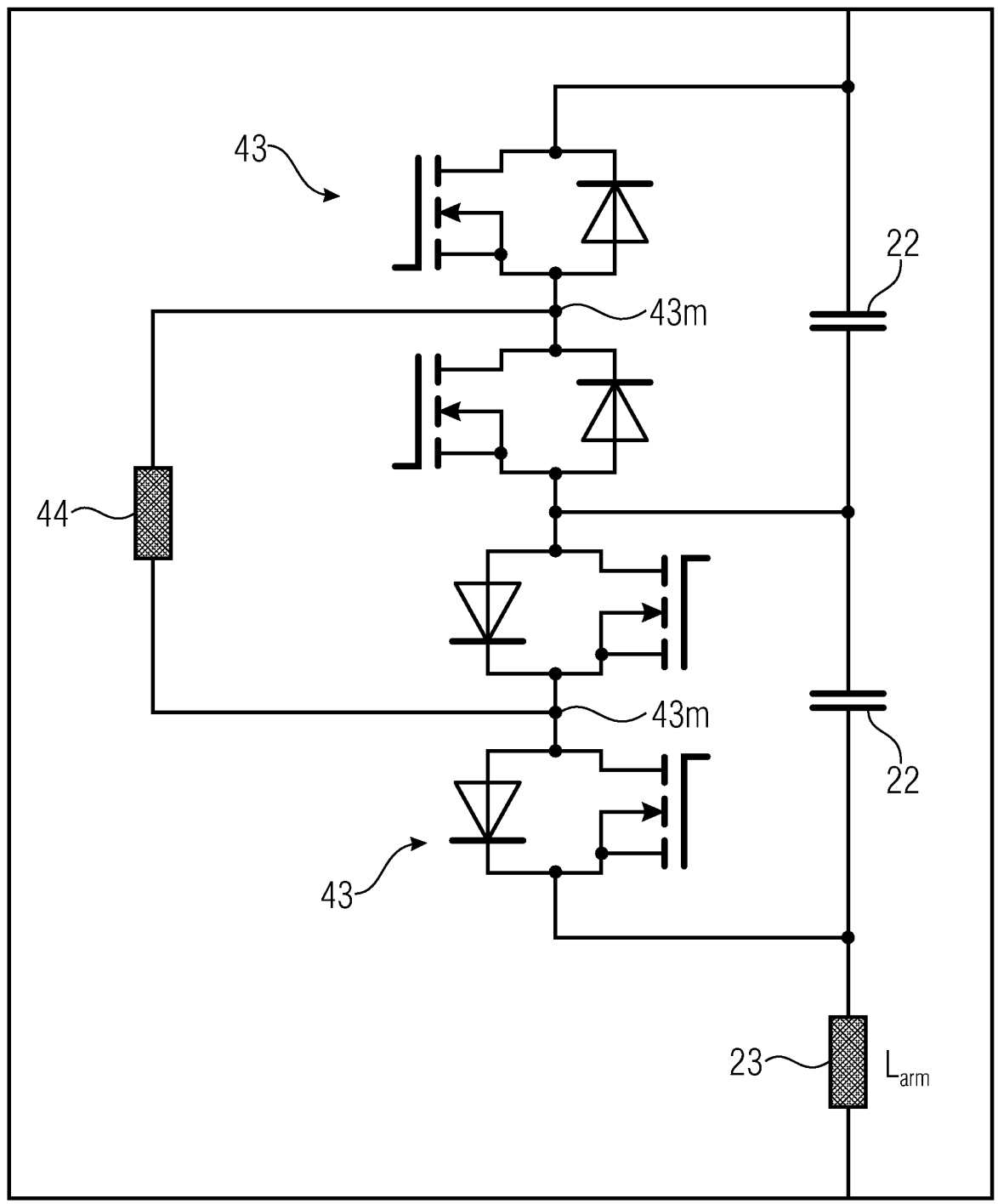

FIG. 8b shows a further variation for an analog cell. This variation includes two capacitances 22 connected in series that are also connected in series with respect to the further submodules. Additionally, the optional arm inductance $L_{arm}$ in the analog cell is connected in series to the capacitances 22. Parallel to each capacitance 22, a half bridge 43 is provided, wherein the half bridges 43 are coupled to one another via their central nodes 43m with the help of an inductance 44.

Here, it should be noted that individual features that have been discussed only in the context of one embodiment are obviously also applicable to the further embodiments. Regarding the above implementations, it has also been assumed that MOSFETs are used as transistors.

Obviously, other switchable elements can be used. It is particularly advantageous when common silicon semiconductors are used in the normal cells (submodules 16a and 16b), while fast WBG semiconductors are used in the analog cells. Thus, the advantages of both technologies can be optimally combined. The functionality of the above embodiment has in particular been explained in the context of an inverter. However, it is obvious that the above discussed current converter circuit is bidirectional, such that also a usage as rectifier would be possible. Also, direct conversion would be possible. By a possible application in all voltage ranges (low to high voltage) application is possible in all areas where inverter topologies are used nowadays.

All above-discussed embodiments have in common that the current converter circuit has an MMC/M2C topology as a basic structure, wherein each has the specific characteristic that at least one analog cell per arm is provided. The analog cell includes, as discussed above, the capacitor $C_{arm}$ connected in series to the normal cells or alternatively a transformer. Current converter valves are connected in parallel to the capacitor $C_{arm}$, which allow specific reloading of $C_{arm}$ and can hence adjust the desired voltage over $C_{arm}$. One or several inductances $L_{analog\_cell}$ are provided between the current converter valves and $C_{arm}$, which can be implemented in a coupled or uncoupled manner.

According to embodiments, the above discussed current conversion topology can be used both in a single phase or multiphase manner. Interleave operation is possible by parallel or multiphase analog cells.

Even when it has been assumed in the above embodiments that DC voltage/AC voltage conversion or vice versa takes place between the DC voltage terminal and the AC voltage terminal, it should be noted that also an AC voltage/AC voltage conversion (1 AC-3 AC) is possible. Here, the single-phase AC voltage would be applied to the further voltage terminal, while the three-phase AC voltage could be tapped via the three-phase AC voltage terminal.

Even when it has been assumed in the above embodiments that the analog cell is arranged closest to the phase, it should be noted that an arrangement at a different position in each arm would be possible. The arm inductance $L_{arm}$, can, but does not have to be integrated in the analog cell.

Further embodiments relate to an operating method as discussed in the context of FIGS. 2d, 2e and 3a to 3c. Optional features of the operating method have been discussed in the context of FIGS. 4a to 4h.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A current converter circuit in a modular multilevel topology, comprising:
    an AC voltage terminal with at least one first phase terminal;
    a further voltage terminal with a first terminal and a second terminal;
    a first arm connecting the first phase terminal and the first terminal;
    a second arm connecting the first phase terminal and the second terminal;
    wherein the first and second arm each comprise at least two submodules connected in series; and
    a controller configured to control the analog cell with a first switching frequency and the other one of the at least two submodules with a second switching frequency, wherein the first switching frequency is higher than the second switching frequency;
    wherein at least one of the at least two submodules is implemented as analog cell comprising a passive device as well as an electric circuit, wherein the passive device is connected in parallel to the electric circuit and connected in series in relation to the other one of the at least two submodules.

2. The current converter circuit according to claim 1, wherein the passive device comprises a capacitor with two terminals and wherein the electric circuit is connected, on the one side, to a first one of the two terminals of the capacitor and, on the other side, to a second one of the two terminals.

3. The current converter circuit according to claim 1, wherein the passive device comprises a transformer via which the electric circuit is coupled.

4. The current converter circuit according to claim 1, wherein the electric circuit is implemented as full bridge.

5. The current converter circuit according to claim 1, wherein the current converter circuit comprises a third and a fourth arm, wherein the third arm connects a second phase terminal of the AC terminal and the first terminal and wherein the fourth arm connects the second phase terminal and the second terminal; or
    wherein the current converter circuit comprises a third, fourth, fifth and sixth arm, wherein the third arm connects the second phase terminal of the AC voltage terminal and the first terminal, wherein the fourth arm connects the second phase terminal and the second terminal, wherein the fifth arm connects a third phase terminal of the AC voltage terminal and the first terminal and wherein the sixth arm connects the third phase terminal and the second terminal.

6. The current converter circuit according to claim 1, wherein at least the first and second arm each comprises three, more than three or twelve submodules.

7. The current converter circuit according to claim 1, wherein both the first arm and the second arm comprise an analog cell.

8. The current converter circuit according to claim 1, wherein the analog cell comprises two passive devices connected in series to which one electric circuit each is connected in parallel.

9. The current converter circuit according to claim 1, wherein the further voltage terminal is a DC voltage terminal, the first terminal is a plus terminal and the second terminal is a minus terminal.

10. A non-transitory digital storage medium having a computer program stored thereon to perform the method for operating a current converter circuit according to claim 1, the method comprising:
controlling the analog cell with a first switching frequency; and
controlling the other one of the at least two submodules with a second switching frequency, wherein the first switching frequency is higher than the second switching frequency,
when said computer program is run by a computer.

11. The current converter circuit according to claim 3, wherein the analog cell comprises a filter capacitance and a further passive device connected in parallel to the transformer and in parallel to the electric circuit.

12. The current converter circuit according to claim 4, wherein the first terminal of the capacitor is connected to a central node of a first one of two half bridges of the full bridge, wherein the second terminal of the capacitor is connected to a central node of the second one of the two half bridges of the full bridge,
wherein a first side of the two half bridges is connected to a second side of the two half bridges via a storage capacitance.

13. The current converter circuit according to claim 4, wherein the full bridge is connected to the two terminals of the capacitor via at least one inductance or wherein the full bridge is connected to the two terminals of the capacitor via one inductance each per terminal of the two terminals.

14. The current converter circuit according to claim 4, wherein the electric circuit comprises several full bridges connected in parallel.

15. The current converter circuit according to claim 4, wherein the electric circuit comprises a third half bridge connected in parallel to the two half bridges of the full bridge, wherein the third half bridge is connected to one of the two terminals of the capacitor via the central node, together with one of the two half bridges of the full bridge, or wherein the third half bridge is connected to one of the two terminals of the capacitor via the central node and via inductances, together with one of the two half bridges of the full bridge.

16. The current converter circuit according to claim 4, wherein the two half bridges of the full bridge are connected to the first one of the two terminals of the capacitor via their central node or wherein the two half bridges of the full bridge are connected to the first one of the two terminals of the capacitor via their central node and via inductances;
wherein a first side of the two half bridges is connected to a second side of the two half bridges via two capacitances connected in series and wherein the central node of the capacitances connected in series is connected to the second one of the two terminals of the capacitor.

17. The current converter circuit according to claim 7, wherein the electric circuit is formed as half bridge and the current converter circuit additionally includes a full bridge, wherein the full bridge is coupled to the central node of the half bridge of the first arm with a first terminal and coupled to the central node of the half bridge of the second arm with a second terminal.

18. The current converter circuit according to claim 14, wherein the several full bridges are connected to one of the two terminals of the capacitor via at least one inductance, wherein the inductances of the several full bridges are electromagnetically coupled.

19. A method for operating a current converter circuit in a modular multilevel topology, comprising:
an AC voltage terminal with at least one first phase terminal;
a further voltage terminal with a first terminal and a second terminal;
a first arm connecting the first phase terminal and the first terminal;
a second arm connecting the first phase terminal and the second terminal;
wherein the first and second arm each comprise at least two submodules connected in series;
wherein at least one of the at least two submodules is implemented as analog cell comprising a passive device as well as an electric circuit, wherein the passive device is connected in parallel to the electric circuit and connected in series in relation to the other one of the at least two submodules,
the method comprising:
controlling the analog cell with a first switching frequency; and
controlling the other one of the at least two submodules with a second switching frequency, wherein the first switching frequency is higher than the second switching frequency.

20. The method according to claim 19, wherein controlling the analog cell is performed such that steps in the voltage curve generated by the other one of the at least two submodules are smoothed.

21. The method according to claim 19, wherein controlling the analog cell is performed in dependence on the following formula:

$$U_{arm\_set} - U_{arm\_cell\_normal} = U_{arm\_analog\_cell};$$

wherein $U_{arm\_set}$ is the set voltage curve, $U_{arm\_cells\_normal}$ is the voltage curve generated by the other one of the at least two submodules and $U_{arm\_analog\_cell}$ is the voltage curve generated by the analog cell.

22. The method according to claim 19, wherein the switchable elements of the analog cells are controlled such that balancing of the voltage takes place in a storage element of the electric circuit.

23. The method according to claim 19, wherein controlling the analog cell comprises shifting the switching times and wherein shifting is performed such that the power absorbed in the analog cell is minimized.

* * * * *